(12) United States Patent
Huang et al.

(10) Patent No.: US 6,614,954 B2
(45) Date of Patent: Sep. 2, 2003

(54) FEEDBACK CONTROL SYSTEM FOR A MEMS BASED OPTICAL SWITCHING FABRIC

(75) Inventors: Cheng-Chung Huang, Sunnyvale, CA (US); Randall B. Sprague, Carnation, WA (US); Daryl Ray Hawkins, Issaquah, WA (US); David Skurnik, Kirkland, WA (US); Eric Charles Abbott, North Bend, WA (US)

(73) Assignee: Transparent Networks, Inc., Santa Clara, CA (US)

( * ) Notice: Subject to any disclaimer, the term of this patent is extended or adjusted under 35 U.S.C. 154(b) by 0 days.

(21) Appl. No.: 10/003,659

(22) Filed: Oct. 24, 2001

(65) Prior Publication Data

US 2003/0077026 A1 Apr. 24, 2003

(51) Int. Cl.[7] .............................. G02B 6/35; G02B 6/26
(52) U.S. Cl. ........................................... 385/18; 385/17
(58) Field of Search ..................................... 385/17, 18

(56) References Cited

U.S. PATENT DOCUMENTS

| 5,319,509 | A | * | 6/1994 | Michelson et al. ...... 360/77.03 |
| 6,154,433 | A | * | 11/2000 | Hoshino et al. ........ 369/112.04 |
| 6,229,640 | B1 | * | 5/2001 | Zhang ........................ 359/290 |
| 6,289,145 | B1 | * | 9/2001 | Solgaard et al. .............. 385/17 |
| 6,327,398 | B1 | * | 12/2001 | Solgaard et al. .............. 385/18 |
| 2002/0131682 | A1 | * | 9/2002 | Nasiri et al. .................. 385/18 |

* cited by examiner

*Primary Examiner*—John D. Lee
*Assistant Examiner*—Tina M Lin

(57) ABSTRACT

A control system for controlling individual mirrors in a MEMS-based optical switching fabric is presented. The control system includes a position sensitive detector positioned to receive a control beam reflected from individual mirrors of a first mirror array. In some embodiments, the control beam can be time-multiplexed with a calibration beam. The position of the control beam corrected in response to the position of the calibration beam can be compared with a position calculated on the port assignment of the individual mirrors in order to provide feedback to a feed-back based control system for the individual mirrors.

8 Claims, 17 Drawing Sheets

FEEDBACK CONTROL SYSTEM FOR A MEMS BASED OPTICAL SWITCHING FABRIC

CROSS REFERENCE TO RELATED APPLICATIONS

This application is related to the following co-filed, commonly assigned, U.S. patent applications: application Ser. No. 09/999,878, application Ser. No. 09/839,848, application Ser. No. 09/999,610, application Ser. No. 09/999,705, and application Ser. No. 10/002,310, all of which are incorporated herein by reference in their entirety. This application is also related to U.S. Pat. No. 6,480,320 entitled "A Microelectromechanical Mirror," filed Feb. 7, 2001, assigned to the assignee of the present invention, and incorporated herein by reference in their entirety.

FIELD OF THE INVENTION

This invention relates generally to switches for optical networks and in particular to a feed-back based control system for optical switching fabrics with tilting mirrors.

BACKGROUND

As optical fiber progressively supplements and replaces metal wire as the backbone of telecommunications networks, the switches that route optical signals have emerged as a significant bottleneck. Transmission systems move information as optical photons but the switching systems and so-called crossconnect fabrics that switch, route, multiplex, and demultiplex optical signals have generally been electronic. Electronic switching requires light to be converted to an electronic signal to pass through the switch and then be reconverted to light in a process termed optical-electronic-optical (OEO) conversion that introduces both time delay and cost.

There is great interest in the telecommunications industry, therefore, in developing all optical switching to avoid the necessity of multiple OEO conversions. On long haul networks, ten's or hundred's of individual wavelengths, each carrying a signal, are multiplexed onto each fiber. Switches are desired that provide all optical switching at the fiber level, the wavelength level, or at both levels. As described, for example, by Bishop et al. in *Scientific American* (January, 2001, pp 88–94), all optical switches based on a number of underlying technologies including Micro Electro Mechanical Systems (MEMS) tilting mirrors, thermo-optical devices, bubbles formed by inkjet printing heads, and liquid crystals, have been proposed. Optical fiber switches based on MEMS mirrors are particularly attractive because they can incorporate very large scale integrated circuits and can be robust, long-lived, and scalable.

An optical fiber switch described in U.S. Pat. No. 5,960,132 to Lin, for example, includes an array of hinged MEMS mirrors, each of which can be rotated about its hinge between a reflective state and a non-reflective state. An array of $N^2$ such mirrors is required to switch signals carried by N input optical fibers from one to another of N output optical fibers. Unfortunately, $N^2$ scaling results in unmanageably complex devices for large N.

Another optical fiber switch described in Bishop et al., cited above, as well as in Bishop et al., Photonics Spectra (March 2000, pp. 167–169) includes an array of MEMS mirrors disposed on a single surface. Each mirror tilts independently to direct light received from an array of input/output optical fibers to any other mirror and thus to any input/output fiber. No internal optical diagnostics for this switch have been described in publications to date.

Still other optical fiber switches are based on two arrays of MEMS mirrors that can be tilted in any direction. Incoming light is directed onto a mirror in the first array which deflects it onto a predetermined mirror in the second array. The mirror in the second array, in turn, directs the lights to the predetermined output port. In these so-called 2N configurations, the position of the mirrors has to be controlled very precisely, to small fractions of degrees, to provide the desired connections.

Therefore, optical fiber switches having a low insertion loss and that can be finely tuned to cross-connect large numbers of input and output fibers would further the development of fiber optic telecommunications networks. Furthermore, control systems for controlling the tuning of optical fiber switches are needed.

SUMMARY

In accordance with the present invention, a control system for controlling individual mirrors in a micro-electromechanical system (MEMS) based optical switching fabric is presented. An optical switching fabric refers to an optical switch with multiple input ports and multiple output ports that allows an optical signal entering the device on any input port to be directed to any output port. As such, the optical switching fabric receives instructions from a node controller and directs light from input ports to assigned output ports based on those instructions.

A MEMS-based optical switching fabric, then, can include an input mirror array receiving signal beams from the input ports and reflecting the signal beams to an output mirror array. The output mirror array receives signal beams from the input mirror array and directs the signal beams to the output ports. A particular signal beam, for example, enters the optical switching fabric through a first input port and is then routed by reflections from an individual mirror of the input mirror array to an individual mirror of the output mirror array. The individual mirror of the output mirror array directs the particular signal beam to its assigned output port in accordance with instructions from the node controller. In some embodiments of the invention, signal beams can travel in both directions through the optical switching fabric so that beams can be received by the output mirror array and directed out of the switching fabric by the input mirror array.

In some embodiments, each of the individual mirrors of the input mirror array receives light from one of the input ports and each of the individual mirrors of the output mirror array directs light to one of the output ports. An individual mirror of the input mirror array can be oriented to direct light from its corresponding input port to one of the individual mirrors of the output mirror array. The individual mirror of the output mirror array receives the light from the individual mirror of the input mirror array and directs it towards an associated output port. Input ports are optically coupled to selected output ports, then, by appropriately orienting the individual mirrors of the input mirror array to direct light to the appropriate mirrors of the output mirror array and appropriately orienting individual mirrors of the output mirror array to receive light from associated individual mirrors of the input mirror array and direct that light to the output port associated with that individual mirror.

In accordance with the present invention, a position sensitive detector is positioned relative to a first mirror array to monitor the orientations of each of the mirrors in the first mirror array. A first control beam, which can be generated by a laser or other optical source, can be directed by dichroic optical elements to be reflected from at least the first mirror array onto the first position sensitive detector. The first mirror array can be either one of the input mirror array or output mirror array. In some embodiments, a first calibration beam can further be directed onto the first position sensitive detector. The orientation of individual mirrors of the first mirror array, then, is directly related to the position of first control beams from each of the individual mirrors of the first mirror array on the cells of the first position sensitive detector.

In some embodiments, a second control beam can be directed colinearily along the signal beam path through a second mirror array and onto cells of a second position sensitive detector. In some embodiments, a second calibration beam can also be directed onto the second position sensitive detector. The orientation of individual mirrors of the second mirror array is directly related to the position of the second control beam from each of the individual mirrors of the second mirror array on the cells of the second position sensitive detector. The second mirror array can be either of the input mirror array or the output mirror array.

In some further embodiments, a third control beam can travel along the signal beam path through the first mirror array and the second mirror array and be directed onto cells of a third position sensitive detector. The third position sensitive detector, which receives the third control beams directed through the first mirror array and the second mirror array, provides data for a fine alignment of the orientation of the mirrors. In some embodiments, a third calibration beam can also be directed onto the third position sensitive detectors in order to calibrate the third position sensitive detector.

In some embodiments, multiple control and calibration beams can be generated by multiple lasers and directed onto position sensitive detectors. For example, the first control beam and the second control beam can be generated by a first laser; the third control beam and the second calibration beam can be generated by a second laser; and the first calibration beam and the third calibration beam can be generated by a third laser. Control beams are directed onto position sensitive detectors by being reflected from one or more of the first mirror array or the second mirror array onto the position sensitive detectors. Calibration beams are not reflected from the first mirror array or the second mirror array. In some embodiments, then, a timing sequence that includes turning a first laser on to generate a first control beam which is reflected from the first mirror array onto the first position sensitive detector and second control beam which is reflected from the second mirror array onto the second position sensitive detector; turning the first laser off and turning a second laser on which generates a third control beam which is reflected from the first mirror array and the second mirror array onto a third position sensitive detector and the second calibration beam which is incident on the second position detector; and turning the second laser off and turning a third laser on which generates the first calibration beam which is incident on the first position detector and a third calibration beam which is incident on the third position sensitive detector. PSD signals from each of the first position detector, the second position detector, and the third position detector, in some embodiments, is integrated, digitized, and stored for later readout by an integration and digitization circuit. A digital signal processor reads out the accumulated data and adjusts the orientation of individual mirrors in the first mirror array and the second mirror array accordingly.

In some embodiments, one or more digital signal processors reads the integrated and digitized data from the position sensitive detectors and, based on that data, adjusts the orientation of individual mirrors in the first mirror array and the second mirror array. The orientation of the individual mirrors in the first mirror array and the second mirror array are held such that control beams reflected from them arrive at cells of the associated position sensitive detectors at particular coordinates. In other words, the orientation of individual mirrors in the first mirror array and the second mirror array, which determines the routing of light from the input ports to the output ports, is monitored through positions on cells in associated position sensitive detectors.

Some embodiments of the invention may include more than two mirror arrays. In those embodiments, PSD detectors can be placed to monitor individual mirrors of each of the mirror arrays in the switching fabric.

These and other embodiments are further discussed below with respect to the following figures.

DETAILED DESCRIPTION

Figure 1:
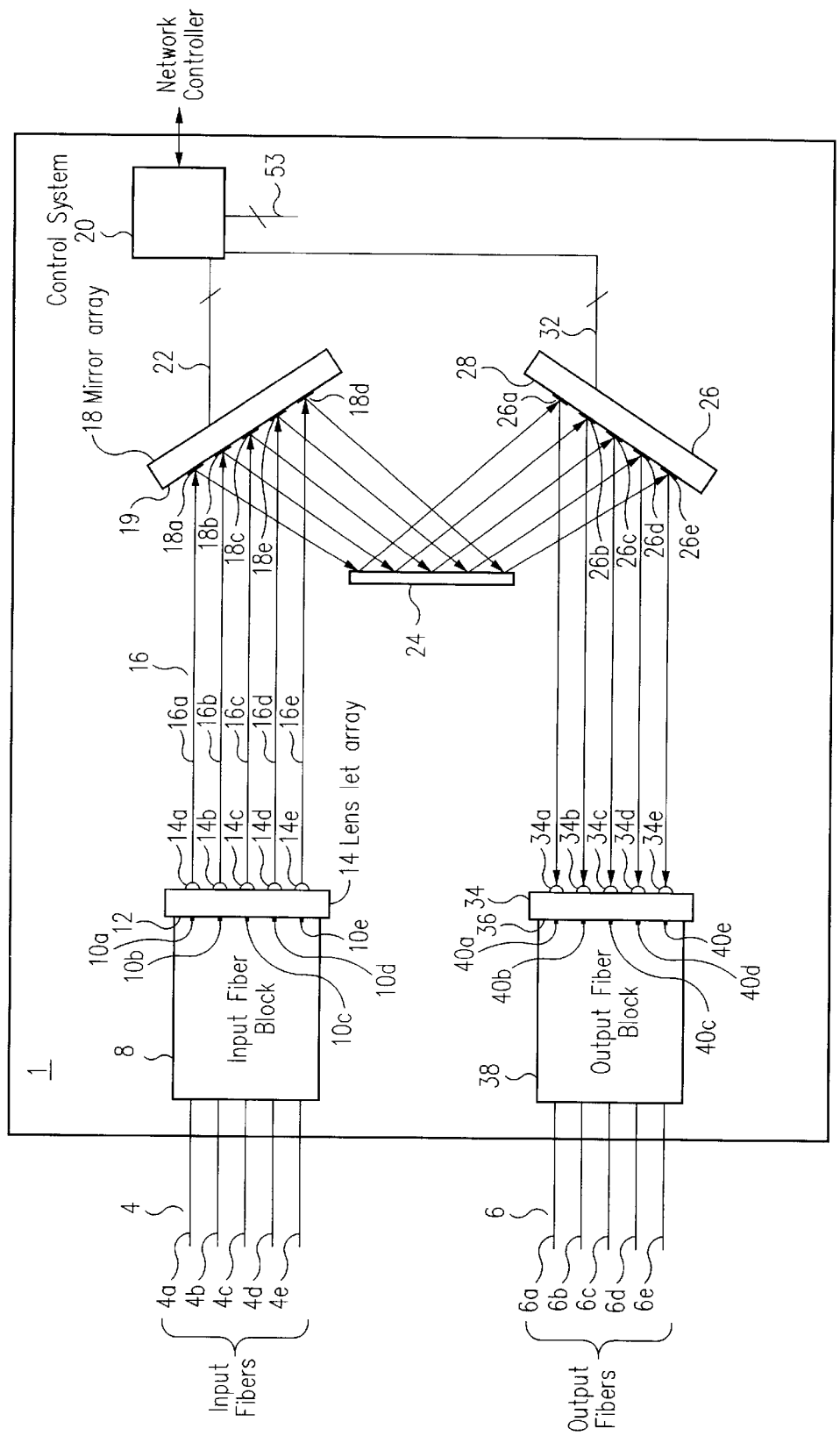
FIG. 1 shows an embodiment of an optical switching fabric according to the present invention.

FIG. 1 shows a block diagram of an embodiment of an optical switching fabric 1. Optical switching fabric 1 is more fully described in U.S. application Ser. Nos. 09/999,878 and 09/999,610, assigned to the same assignee as is the present disclosure, herein incorporated by reference in its entirety.

Optical switching fabric 1 is capable of switching light from any number of import ports into any number of output ports. In some embodiments, the number of input ports and the number of output ports can be on the order of 1000 so that a 1000 by 1000 optical switch results. In optical switching fabric 1, as shown in FIG. 1, input fibers 4, of which fibers 4a through 4e are explicitly shown, are received into input fiber block 8. An embodiment of input fiber block 8 is more fully described in U.S. application Ser. No. 09/866,063, assigned to the same assignee as the present invention, herein incorporated by reference in its entirety.

Light from input fibers 4 is directed into lenslet array 12 from fiber ends 10, of which fiber ends 10a through 10e corresponding to fibers 4a through 4e, respectively, are explicitly shown. In lenslet array 14, light is collimated by small lenses 14, of which lenses 14a through 14e are explicitly shown, to form beams 16, of which beams 16a through 16e, corresponding to the light from fibers 4a through 4e, respectively, are explicitly shown. Light beams 16 are received in an input mirror array 18. Mirror array 18 includes an array of micro-electronic mirrors arranged to direct beams 16. Light beams 16, then, are directed onto reflecting surface 24 and then onto individual mirrors of output mirror array 26. In some embodiments, each mirror of mirror array 18, of which individual mirrors 18a through 18e are shown, direct light from one of input fibers 4, 4a through 4e, respectively, onto any one of the mirrors of mirror array 26. Individual mirrors of mirror array 26, of which mirrors 26a through 26e are explicitly shown, direct light through lenslet block 34 and output fiber block 38 to corresponding ones of output fibers 6. Each of the individual mirrors of mirror array 26 is directed to reflect light onto one of the microlenses of lenslet array 34. Mirrors 26a through 26e, shown in FIG. 1, then direct light onto lenses 34a through 34e, respectively, of lenslet array 34. Lenslet array 34, then, directs light beams from lenses 34a through 34e onto fiber ends 40a through 40e, respectively, in output fiber block 38. Although mirror array 18 is referred to here as an input mirror array and mirror array 26 is referred to as an output mirror array, one skilled in the art will recognize that some of ports 4 can be used as outputs and some of ports 6 can be used as inputs.

As an example, the light from input fiber 4c can be directed by mirror 18c of mirror array 18 onto mirror 26a of mirror array 26. Mirror 26a is arranged to receive a light beam from mirror 18c and direct that light beam onto lens 34a for coupling into output fiber 6a of optical fibers 6.

Individual mirrors of mirror array 18 and mirror array 26 can be controlled by control system 20. Control system 20 receives routing information from a network controller (not shown) to direct light from one of input fibers 4 to one of output fibers 6. Control system 20, then, arranges individual mirrors of mirror array 18 and individual mirrors of mirror array 26 so that light is routed between the input fibers and the output fibers as directed by the network controller and continuously monitors the orientations of individual mirrors on mirror arrays 18 and 26 so that the individual mirrors maintain the appropriate assigned orientations.

In some embodiments, individual mirrors of mirror array 18 and mirror array 26 can be oriented two dimensionally, in order to direct light into a two dimensional plane. (dθ, dψ). FIGS. 2A, 2B, 2C, and 2D show an embodiment of a single mirror 100, which can be one of the individual mirrors of mirror array 18 or mirror array 28. Mirror 100 is further described in U.S. application Ser. No. 09/779,189 entitled "A Microelectromechanical Mirror," filed Feb. 7, 2001 by Steven Nasiri, assigned to the same entity as is the present invention, herein incorporated by reference in its entirety, now U.S. Pat. No. 6,480,320.

Figure 2A:
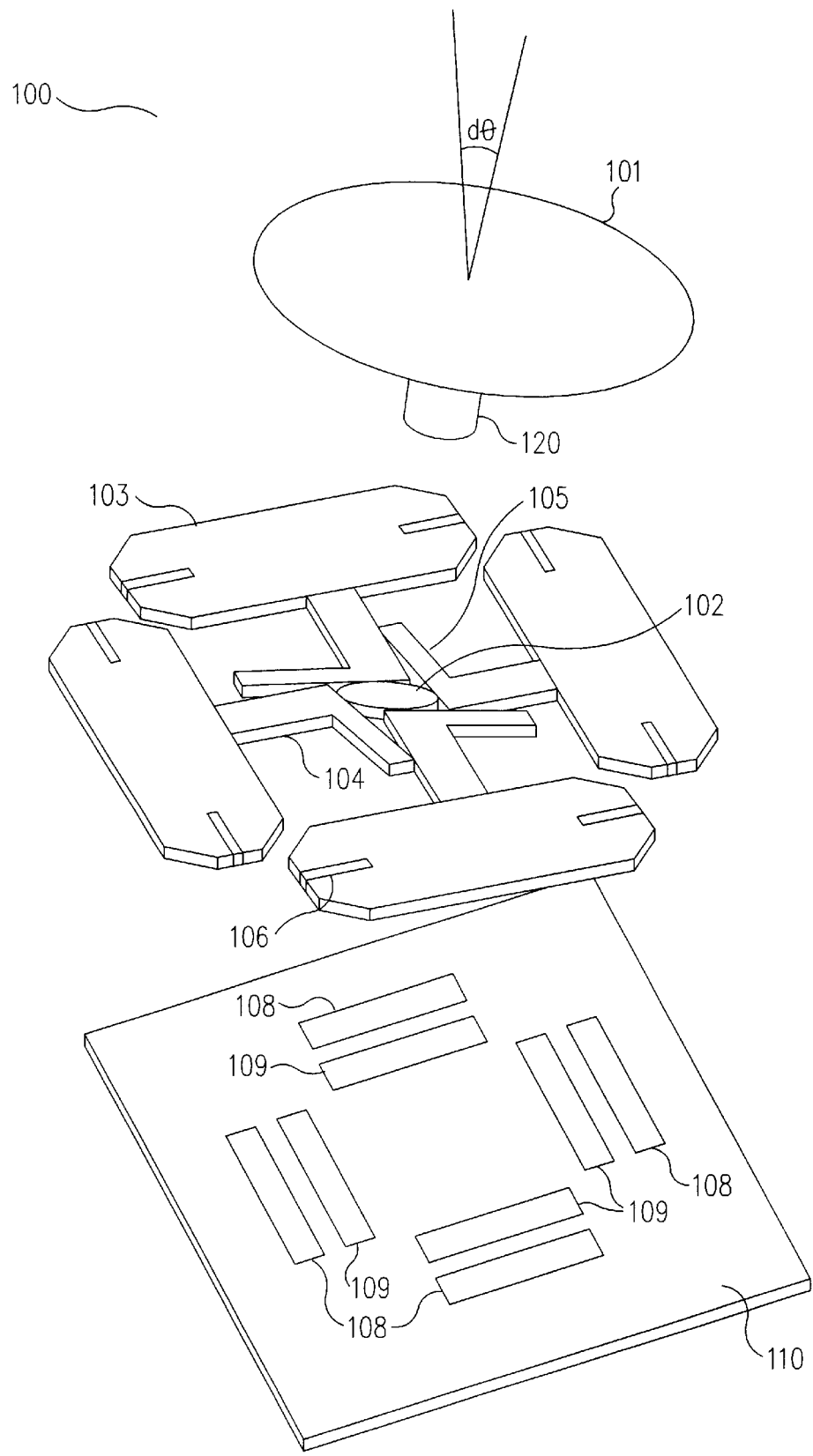
FIGS. 2A, 2B, 2C and 2D show an embodiment of an individual mirror of a mirror array with an embodiment of the actuator system for controlling the orientation of the individual mirror.
Figure 2B:
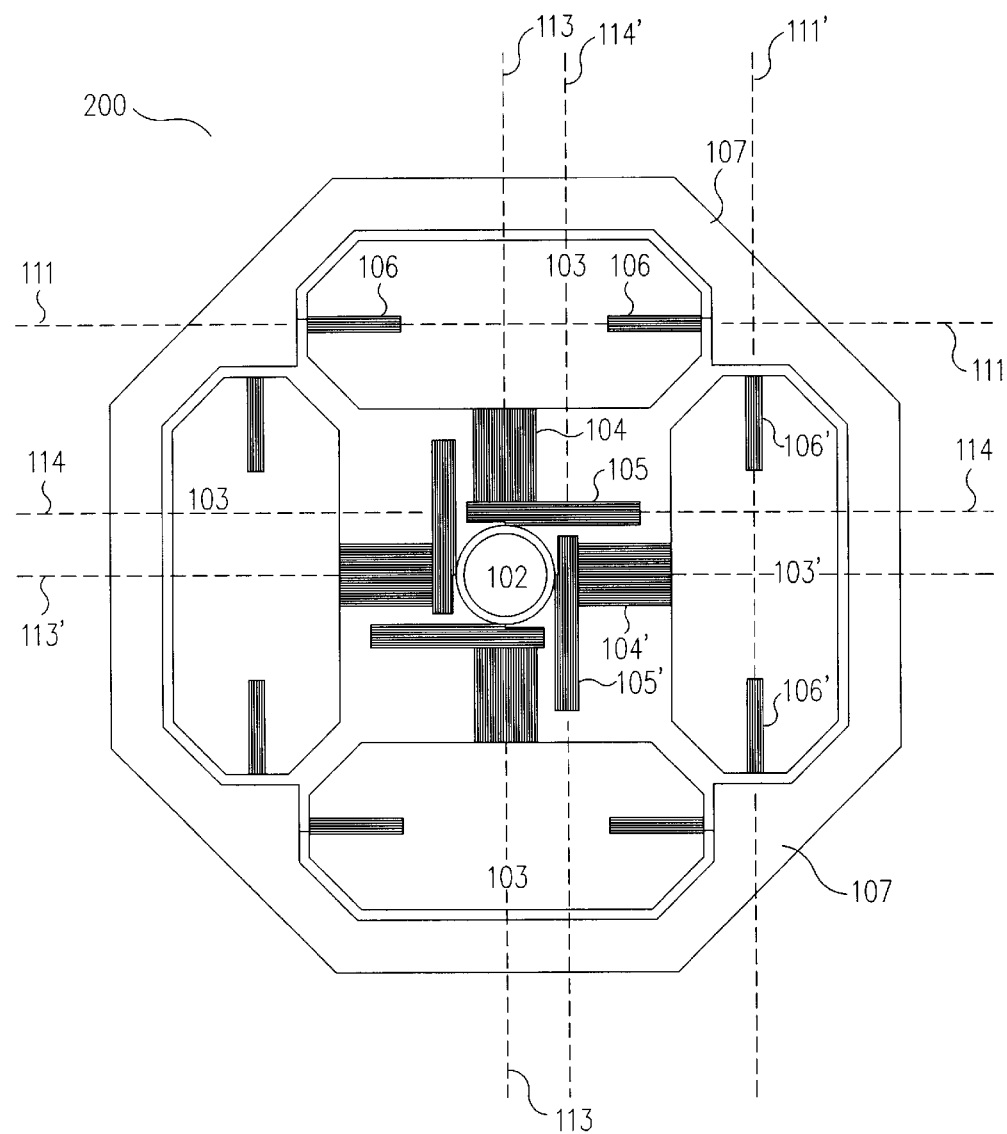

As shown in FIG. 2A, mirror 100 includes a mirror surface 101 positioned on a post 120. Post 120 is mounted on a freely movable plate 102 which is suspended from electrostatic actuators 103. As shown in FIG. 2B, actuators 103 are themselves suspended from actuator frame 107, all of which is formed in an actuator layer 200 of mirror array 18 or 26. Actuators 103 are coupled to freely movable plate 102 with plate flexures 104 and 105. Since mirror surface 101 (FIG. 2A) is mounted to movable plate 102 by post 120, mirror surface 101 rotates with freely movable plate 102. As shown in FIG. 2A, a torque can be applied to each of actuators 103 by electrostatic electrodes 108 and 109 positioned adjacent to actuators 103 on substrate 110. Actuators 103, in the embodiment of mirror 100 illustrated in FIGS. 2A through 2D, are positioned in two opposing pairs with respect to freely movable plate 102. The surface of mirror 101, then, can be tilted in two directions. In general, any number of actuators 103 can be positioned about and coupled to freely movable plate 102 in order to control the orientation of mirror 101.

Figure 2C:
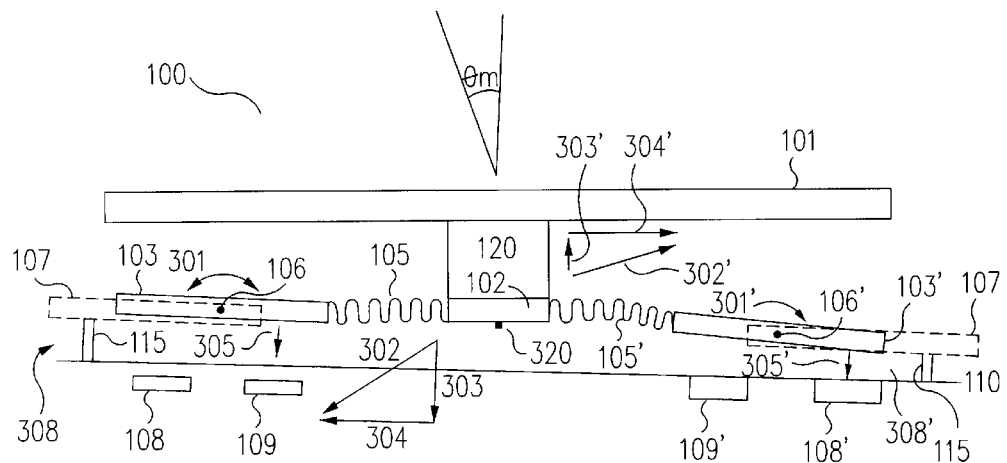

As shown in FIG. 2B, each of actuators 103 rotates about an axis 111 and therefore provides a torque to freely movable plate 102 to rotate plate 102 about an axis 113. FIG. 2C illustrates the operations of actuators 103 and 103' in rotating mirror surface 101 through an angle $\theta_m$. Opposing actuators positioned perpendicularly to actuators 103 and 103' in FIG. 2C rotate mirror surface 101 through an angle $\phi_m$. Actuator support 107 on actuation layer 200 is separated from substrate 110 by posts 115. Electrodes 108 and 109 are positioned on substrate 110 below actuator 103 so that actuator 103 can be rotated about pivot support 106 by application of voltages to electrodes 108 and 109. Similarly, actuator 103' is rotated about pivot support 106' by application of voltages to electrodes 108' and 109'. In some embodiments, a bias voltage can be applied to actuators 103 and 103' through support 107. In some embodiments, the bias voltage can be about negative 60V. Application of a positive voltage to electrode 109, then, causes actuator 103 to rotate in a clockwise direction towards electrode 109, pushing the end of support 105 towards substrate 110. In some embodiments, application of a positive 60V to electrode 109 and negative 60V to actuator 103 can cause a rotation of about 1° in actuator 103. This amount of rotation of actuator 103 can translate, depending on the particular geometry of mirror 100, to an angular deflection in mirror surface 101, $\theta_m$, much greater than the rotation of actuator 103. In some particular embodiments, the angular deflection of mirror surface 101 on a 1° deflection of actuator 103 can be about 5.5°. A 5.5° deflection results in control of the orientation of mirror 101 through about 11°, 5.5° each side.

Similarly, application of a positive voltage to electrode 108' causes actuator 103' to rotate in a clockwise direction towards electrode 108', causing the end of support 105' coupled to actuator 103' to move away from substrate 110.

In that fashion, freely movable plate 102, and therefore mirror surface 101, is caused to move in a counterclockwise direction through an angle $\theta_m$. Similarly, applying positive voltages to electrodes 108 and 109' cause mirror surface 101 to move in a clockwise direction.

In some embodiments, freely movable surface 102 is not translationally moved from its equilibrium position by rotational displacements of actuators 103 and 103'. The rotational displacements of actuators 103 and 103' simply rotate freely movable surface 102 about a rotational axis directed out of the plane of FIG. 2C through freely movable surface 102. Further, mechanically excited vibrational motions of mirror surface 101 can be damped by supports 105 and 105'.

Mounting mirrored surface 101 (FIG. 2A) above electrostatically actuated plate 102 (FIG. 1) and actuation layer 200 allows a plurality of mirrors 100 to be packed densely together in a mirror array, which can be one of mirror arrays 18 and 19, such that the surface of the mirror array is substantially mirrored. In this way, light can be readily switched from a plurality of input fibers to a plurality of output fibers as shown in FIG. 1. Further, although the particular embodiment of the mirrors of mirror arrays 18 and 26 shown in FIGS. 2A through 2D includes four actuators, perpendicular pairs of two, any number of actuators greater than two can be utilized to provide a rotation of mirror surface 101.

Figure 2D:
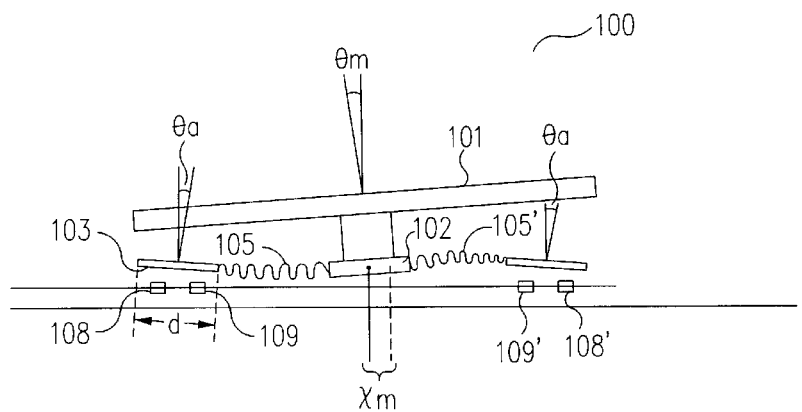

FIG. 2D shows a diagram of mirror 101 in operation. Actuator 103 is rotated by an angle $\theta_a$ about pivot point 106. Furthermore, actuator 103' is rotated by angle $\theta_a$ in the same direction around pivot point 106'. Mirror surface 101, then, is rotated an angle $\theta_m$ from its equilibrium position and, in addition, may be translated a distance x from the equilibrium position as a result.

A model for the motion of mirror surface 101 can be expressed as $$M\ddot{x}+B\dot{x}+Kx=GT, \quad (1)$$

where M, B, and K are matrices whose elements depend on various physical constants associated with the geometry of mirror 100. The variable x is a vector quantity referred to as the system state. The overdot notation refers to the time derivative of the elements of x. In the embodiment of mirror 100 shown in FIG. 2D, x can be defined as $$x = \begin{bmatrix} \theta_m \\ \theta_a \\ x_m \end{bmatrix}, \quad (2)$$

where $\theta_m$ is the mirror angle (i.e., the angle between the equilibrium position and the current position of the normal to mirror surface 101), $\theta_a$ is the angle of actuators 103 and 103', and $x_m$ is the lateral displacement of mirror 101 from the equilibrium position.

The variable T is the torque applied to actuators 103 and 103' in order to produce the motion of mirror 101. The matrix G, the so-called input matrix, then is given by $$G = \begin{bmatrix} 0 \\ 1 \\ 0 \end{bmatrix}. \quad (3)$$

The torque T is a scalar forcing functions and is a function of the voltage V applied to the actuators, the actuator angle $\theta_a$, and the distance d between the actuator and the electrode when $\theta_a$ is 0. Further, in the geometry of FIGS. 2A through 2D, the torque is the sum of two values because of the two electrodes. The torque T from one of the two electrodes, then, can be given by $$T = \int_0^X \frac{(1/2)\varepsilon_0 V^2 r}{(d-r\sin\theta_a)^2} dr, \quad (4)$$

where the variable of integration r represents the distance along actuator 103 from pivot point 106 to the outer edge of actuator 103. The upper limit of integration X, then, is ½ the length of actuator 103, d. The torque T, then, is found analytically to be $$T = \begin{cases} \left(\frac{d+g\ln(g)}{g\sin^2(\theta_a)} - \frac{1+\ln(d)}{\sin^2(\theta_a)}\right)\frac{\varepsilon_0}{2}V^2 & \text{if } \theta_a \neq 0 \\ \frac{\varepsilon_0 X^2 V^2}{4d^2} & \text{if } \theta_a = 0, \end{cases} \quad (5)$$

where $$g = d \pm X \sin\theta_a, \quad (6)$$

wherein g differs in the sign of the second term depending on which electrode, electrode 108 or electrode 109, is activated to rotate actuator 103. In some embodiments, only one of electrodes 108 and 109 and the corresponding electrode 109' and 108', respectively, are activated.

The complete equation of motion which approximates the motion of mirror surface 101 as a function of time, then, is given by $$M\ddot{x}+B\dot{x}+Kx = \begin{cases} G\left(\frac{d+g\ln(g)}{g\sin^2(\theta_a)} - \frac{1+\ln(d)}{\sin^2\theta_a}\right)\frac{\varepsilon_0}{2}V^2 & \text{if } \theta_a \neq 0 \\ G\frac{\varepsilon_0 X^2 V^2}{4d^2} & \text{if } \theta_a = 0. \end{cases} \quad (7)$$

A study of this system of differential equations reveals that the mirrors can be unstable in certain regimes of allowable motion. The instabilities result from the torque on the actuator, T, being a function of the mirror position. As the actuator draws closer to the electrode, the electrostatic force increases with the square of the separation. At some point, the electrostatic force on actuator 103 becomes greater than the restoring force provided by link 105 and further displacements of mirror 101 become unstable without active and continuous correction of the voltages to electrodes 108 and 109 (and correspondingly electrodes 108' and 109').

Additionally, the equations of motion describing mirror 100 are nonlinear. However, the only nonlinearity arises in the torque term T(s). A control system according to the present invention can take advantage of the low level of non-linearity of the equations of motion.

Figure 2F:
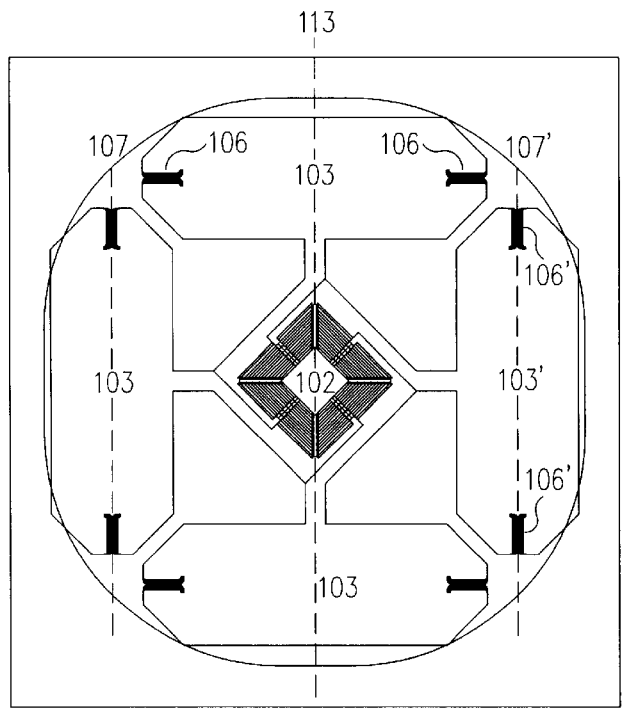
FIG. 2F shows another embodiment of actuator control of mirrors according to the present invention.
Figure 2E:
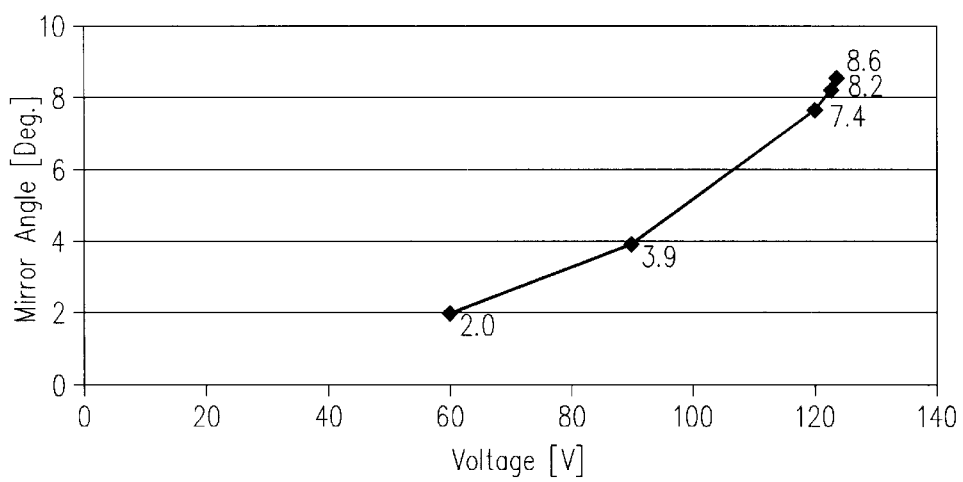
FIG. 2E shows the relationship between the voltage and mirror angle for an embodiment of a mirror as shown in FIGS. 2A through 2D.

FIG. 2E shows the relationship between the voltage applied to opposing actuators 103 and 103' and the angle of mirror surface 101. An angle of about 2.0°, for example, can be attained with a voltage of about 60V. The mirror becomes unstable at a voltage of about 120 V, where the angle can be between about 7.4 and 8.6°.

The particular embodiment of mirror 100 shown in FIG. 2D includes opposing actuators 103 and 103' to control the rotation of mirror surface 101 in one direction. A separate set of opposing actuators 103 (see FIGS. 2A and 2B) can rotate mirror surface 101 in a direction perpendicular to the direction controlled by actuators 103 and 103'. In modeling the rotational motion of mirror surface 101, it can be assumed that these motions are separate (i.e., the cross-talk between the two orthogonal motions is minimized). In embodiments having a different arrangement of actuators, other models than the one discussed as an example here can be determined.

FIG. 2F shows an embodiment of mirror 100 with another coupling of actuators 103 and 103' with actuated plate 102. In effect, actuator 103 and 103' operate to control motion of actuated plate 102 along a rotation axis 113 parallel with the rotation axis of actuators 103 and 103', axis 107 and 107' respectively. The model described above for the rotational motion of actuator plate 102 with the voltages applied to actuators 103 and 103' can also apply to the embodiment of mirror 100 shown in FIG. 2F.

Figure 3:
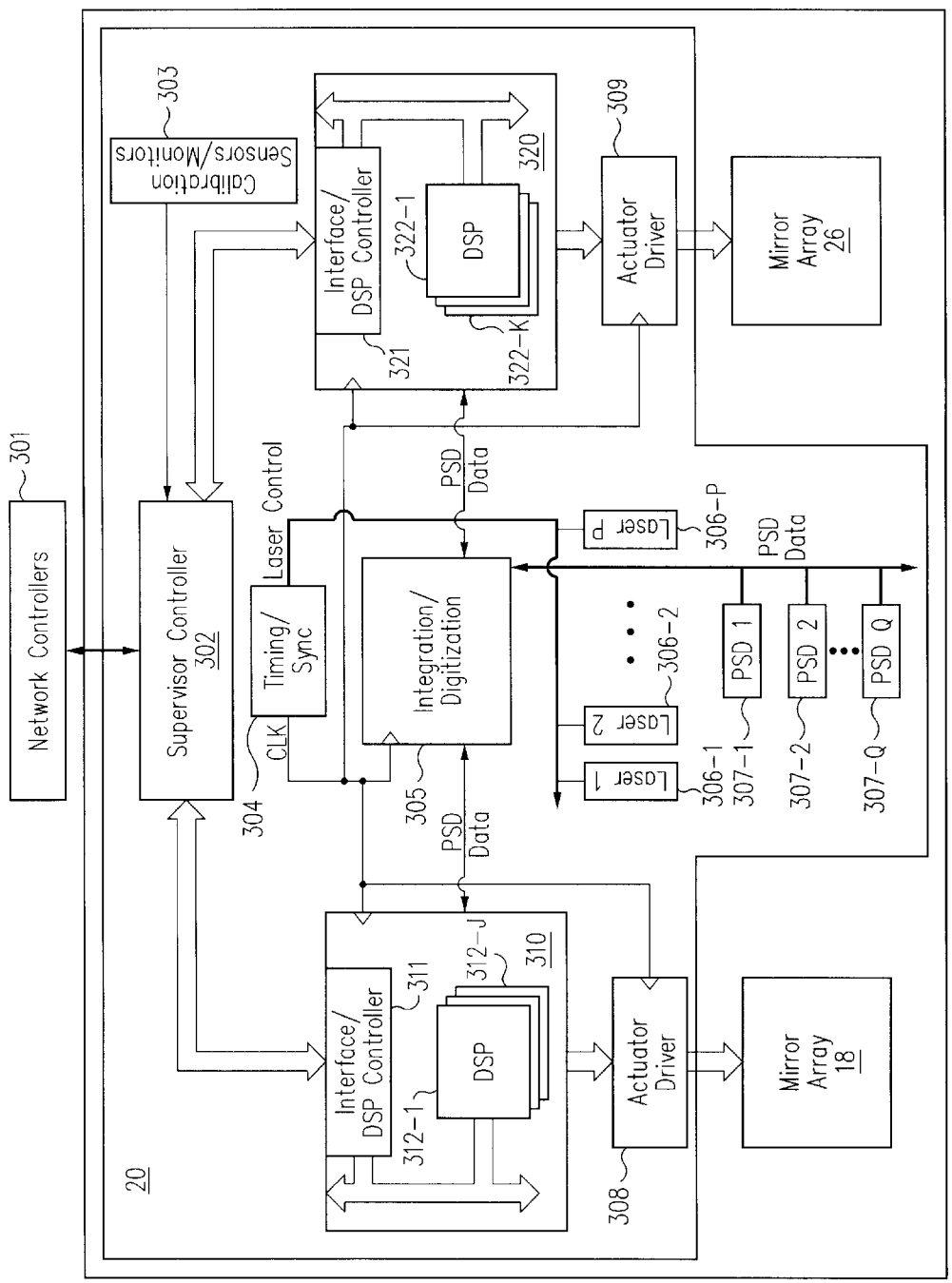
FIG. 3 shows a block diagram of a control system for an optical switching fabric according to the present invention.

FIG. 3 shows an embodiment of control system 20 (FIG. 1). Control system 20 receives commands from an optical switching node control system 301 outside of optical switching fabric 1. Optical switching node control system 301, for example, can request a selected input port be switched to a selected output port. Furthermore, error messages and evaluation data (e.g., current mirror orientation, current actuator voltages, and other measured parameters) from control system 20 can be communicated to optical switching node 301.

Control system 20 includes a supervisor control system 302 and local mirror control system 310 and 320. In the embodiment shown in FIG. 3, mirror control system 310 controls mirror array 18 and mirror control system 320 controls mirror array 26. Supervisor control system 302 monitors the overall operation of switching fabric 1 and maintains overall calibrations of local mirror controllers 310 and 320. Local mirror controllers 310 and 320 control individual mirrors on mirror array 26 and mirror array 18, respectively, so that mirrors are appropriately oriented to route light beams from selected input ports to selected output ports as was originally requested by optical switching network controller 301. Supervisor control system 302 and calibration monitors associated with Supervisor control system 302 (e.g., a multi-point calibration system and reflective light monitoring feedback system) are further described in U.S. application Ser. No. 09/999,705, assigned to the same assignee as is the present invention, herein incorporated by reference in its entirety.

The angular orientations of mirrors in mirror arrays 18 and 26 are monitored through control beams generated by lasers 306-1 through 306-P. In some embodiments, the control beams from lasers 306-1 through 306-P are within a different spectral range from the beams of light being switched by switching fabric 1. For example, in some embodiments lasers 306-1 through 306-P generate visible light whereas light directed between input port 4 (FIG. 1) and output port 6 is infrared. In that case, dichroic elements can be utilized so that control beams from lasers 306-1 through 306-P can be directed along the same optical paths through mirror arrays 18 and 26 as are the switched optical beams. Additionally, the control beams from lasers 306-1 through 306-P can be directed onto position sensitive detector arrays 307-1 through 307-Q to provide data regarding the orientation of each individual mirror in mirror arrays 18 and 26. An embodiment of an optical system having three lasers 306-1 through 306-3 and three PSD detectors 307-1 through 307-3 is described in U.S. application Ser. No. 09/999,878, "Optical configuration for Optical fiber Switch," by C. C. Huang, and U.S. application Ser. No. 09/839,848, assigned to the same assignee as is the present invention, herein incorporated by reference in its entirety. Another embodiment of an optical system as described above is described in U.S. application Ser. No. 10/002,310, "Architecture for Optical Fiber Switch," by C. C. Huang et al., assigned to the same assignee as the present invention, herein incorporated by reference in its entirety.

Mirror controller 310 includes an interface link and system controller 311 coupled to one or more digital signal processors (DSPs) 312-1 through 312-J (collectively referred to as DSP 312). In some embodiments, an individual one of DSPs 312-1 through 312-J is utilized to control groups of individual mirrors of mirror array 18. For example, each row of mirrors in mirror array 18 can be controlled by one of DSPs 312-1 through 312-J, where J is the number of rows of mirrors in mirror array 18. In some embodiments of the invention, mirror array 18 can include 30 rows of 40 mirrors (for a total of 1200 individual mirrors), with 30 DSP's (DSPs 312-1 through 312-30), each controlling 40 individual mirrors along an assigned row. Each of DSPs 312-1 through 312-J communicate with interface 311 for individual commands regarding the angular positions of the mirrors in mirror array 18 that fall within the responsibility of the individual ones of DSPs 312-1 through 312-J.

DSPs 312-1 through 312-J output signals to an actuator driver 308 which provides the appropriate voltage signals to electrodes 108 and 109 of actuator 103 (FIG. 2A) of each of individual mirrors 100 in order to hold the orientation of mirrors 100 to the requested orientation. The requested orientation is the orientation appropriate to fulfill the request of coupling light from the input ports 4 (FIG. 1) to the assigned ones of output ports 6. The orientation of individual mirrors of mirror array 18 can be monitored by at least one of position sensitive detectors (PSDs) 307-1 through 307-Q. The PSD signals from PSDs 307-1 through 307-Q can be input to integration and digitization circuitry 305 and the resulting digitized PSD data can be read by DSPs 312-1 through 312-J. In some embodiments, a timing and sync generator 304 or other control circuit can control the timing and communications of data into mirror array 18 and data out of PSDs 307-1 through 307-Q into individual ones of DSPs 312-1 through 312-J.

In some embodiments, the data received by DSPs 312-1 through 312-J indicate the position of a control beam on one of PSDs 307-1 through 307-Q. In some embodiments, PSDs 307-1 through 307-Q are positioned with respect to mirror arrays 18 and 26 such that each individual cell of PSDs 307-1 through 307-Q receives a light beam reflected from an individual mirror from mirror arrays 18 and 26. Therefore, the position of the control beam on individual cells of PSDs 307-1 through 307-Q indicate directly the orientation of the individual mirrors of mirror arrays 18 and 26. The orientation of individual mirrors of mirror arrays 26 and 18, then, can be monitored in terms of the position of the control beam on PSDs 307-1 through 307-Q. In some embodiments, calibration beams not reflected from either mirror array 18 or mirror array 26 are directed onto position sensitive detectors 307-1 through 307-Q. Calibration beams allow the measured position of control beams to be corrected for drift in the performance of position sensitive detectors 307-1 through 307-Q.

In some embodiments, optical switching node controller 301 can communicate requests and commands to supervisor controller 302 in the form of (input port, output port), indicating which input port needs to be optically coupled to which output port. Supervisory control system 302 then can indicate to mirror controller 310 that a particular individual mirror of mirror array 18, which corresponds to a requested input port, is to be oriented to direct light from the requested input port to an individual mirror of mirror array 26 which corresponds to the requested output port. Interface 311, then, can indicate to the appropriate one of DSPS 312-1 through 312-J that the particular individual mirror be appropriately oriented to achieve the requested routing. In some embodiments, a look-up table of input port orientations can be kept and maintained in interface 311 or, in some embodiments, in each of DSPs 312-1 through 312-J. The lookup table includes the data of which location, as measured on one of PSDs 307-1 through 307-Q, of a control beam reflected from the individual mirrors is appropriate for the desired orientation of the individual mirror in order to fulfill the requested routing. DSPs 312-1 through 312-J, then, control the orientation of the individual mirror in order to hold the appropriate location as measured by one or more of PSDs 307-1 through 307-Q. In some embodiments, the look-up tables can be routinely updated and recalibrated by supervisory controller 302.

Similarly, supervisor controller 302 also communicates with mirror controller 320 through interface/controller 321. Mirror controller 320 includes DSPs 322-1 through 322-K (collectively referred to as DSP 322) which are also coupled to receive data from some of PSDs 307-1 through 307-Q through integration and digitization circuit 305. In response to position measurements indicating the orientation of individual mirrors of mirror array 26, DSPs 322-1 through 322-K outputs to actuator driver 309 signals which control the orientation of individual mirrors of mirror array 26. Again, actuator driver 309 receives control signals for each individual mirror of mirror array 26 and generates the appropriate actuator voltages for controlling the individual mirrors. Again, each of DSPs 322-1 through 322-K monitors and controls a subset of the individual mirrors of mirror array 26, which in some cases can be individual rows of mirrors.

Timing and synchronization circuit 304 controls which of lasers 306-1 through 306-P are currently on to generate control beams and, in some embodiments, calibration beams. Furthermore, timing and synchronization circuit 304 controls how long data from each of PSDs 307-1 through 307-Q is integrated in integration and digitization circuit 305 and indicates when data is ready to be read out by DSPs 312-1 through 312-J of mirror controller 310 and DSPs 322-1 through 322-K of mirror controller 320. In some embodiments, different calibration and mirror orientation data can be measured by PSDs 307-1 through 307-Q depending on which of lasers 306-1 through 306-P is generating control or calibration beams. Since lasers 306-1 through 306-P, in some embodiments, are of similar frequencies so that the same dichroic elements can be used to rout control beams from each of lasers 306-1 through 306-P, timing circuit 304 arranges that control beams from only one of lasers 306-1 through 306-P are incident on each of PSDs 307-1 through 307-Q at a time. In embodiments where lasers 306-1 through 306-P generate control beams of different frequencies, PSDs 307-1 through 307-Q can be sensitive to the different frequencies.

Figure 4:
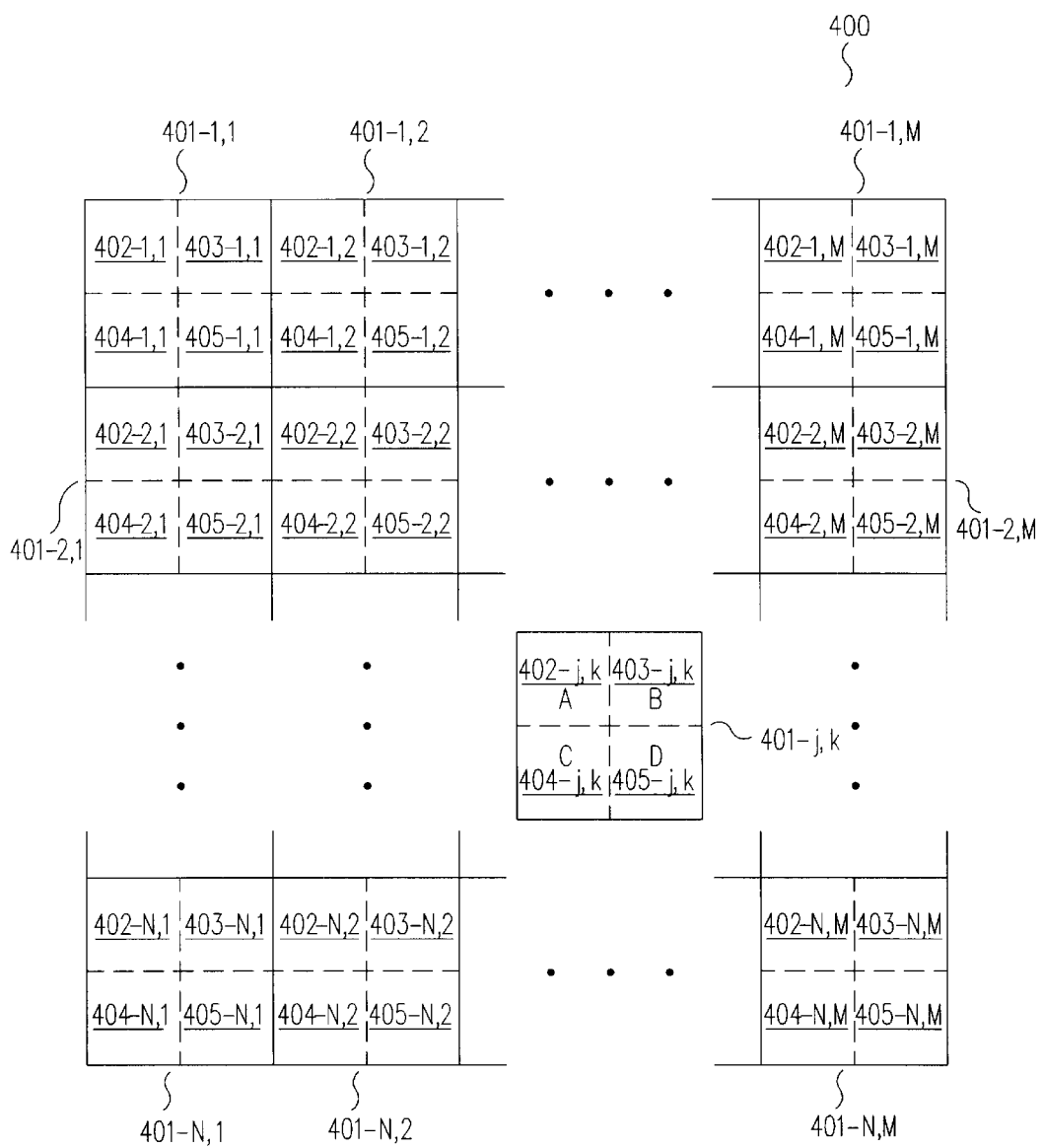
FIG. 4 shows an embodiment of a position sensitive detector which can be utilized in the control system of FIG. 3.

FIG. 4 shows a schematic diagram of a position sensitive detector (PSD) 400, which can be any of PSDs 307-1 through 307-Q. PSD 400 includes an array of N by M cells 401-1,1 through 401-N,M with N rows and M columns. Each of cells 401-1,1 through 401-N,M are isolated. In some embodiments, the photosensitive material, which can be for example InGaAs detectors or a Si device such as Quad PIN diodes, can be formed by bonding the material to a glass slide and dicing the material to form isolated cells 401-1,1 through 401-N,M. Each of cells 401-1,1 through 401-N,M, then, includes a quadrature of regions 402-1,1 through 402-N,M, 403-1,1 through 403-N,M, 404-1,1 through 404-N,M, and 405-1,1 through 405-N,M, respectively. In cell 401-j,m, an arbitrary one of cells 401-1,1 through 401-N,M, region 402-j,k provides a signal $I_A$, region 403-j,k provides a signal $I_B$, region 404-j,k provides a signal $I_C$ and region 405-j,k provides a signal $I_D$. Signals $I_A$, $I_B$, $I_C$, and $I_D$ are usually current signals indicative of the light intensity incident on regions 402-j,k, 403-j,k, 404-j,k, and 405-j,k, respectively. In some embodiments, cells can have any number of regions from which the position of a beam incident on the cell can be determined.

The position of a light beam on cell 401-j,k is indicative of the orientation of the individual mirror corresponding to cell 401-j,k. In some embodiments, each cell 401-j,k is positioned to receive light reflected from a corresponding one of the individual mirrors of mirror array 18 or 26. The x coordinate of a beam of light incident on cell 401-j,k can be determined as $$x = \alpha \frac{(I_B + I_D) - (I_A + I_C)}{I_A + I_B + I_C + I_D}, \quad (10)$$

and the y coordinate is given by $$y = \beta \frac{(I_A + I_B) - (I_C + I_D)}{I_A + I_B + I_C + I_D}, \quad (11)$$

where $\alpha$ and $\beta$ are proportionality constants. In some embodiments, the dimensions of cell 402-j,k is approximately 1 mm square. The physical orientation of the individual mirror associated with cell 401-j,k is determined by the position of the center of the beam received by cell 401-j,k.

Position sensitive detector (PSD) 400 is electrically coupled to integration and digitalization circuitry 305. In some embodiments, electrical connections directly to the photosensitive material for applying bias voltages and receiving intensity signals are accomplished through bump connections. Although bias voltages can be globally applied to each of cells 401-1,1 through 401-N,M, electrical connections to each of regions 402-1,1 through 402-N,M, 403-1,1 through 403-N,M, 404-1,1 through 404-N,M and 405-1,1 through 405-N can be made through bump connections in order that integration and digitization 305 can receive signals from each region of each of cells 401-1,1 through 401-N,M. Calculations of position of beams in each cell can, then, be accomplished by DSPs 312-1 through 312-J or DSPs 322-1 through 322-K based on the filtered, integrated, and digitized signals from each of regions 402-1,1 through 402-N,M, 403-1,1 through 403-N,M, 404-1,1 through 404-N,M and 405-1,1 405-N,M.

Figure 5A:
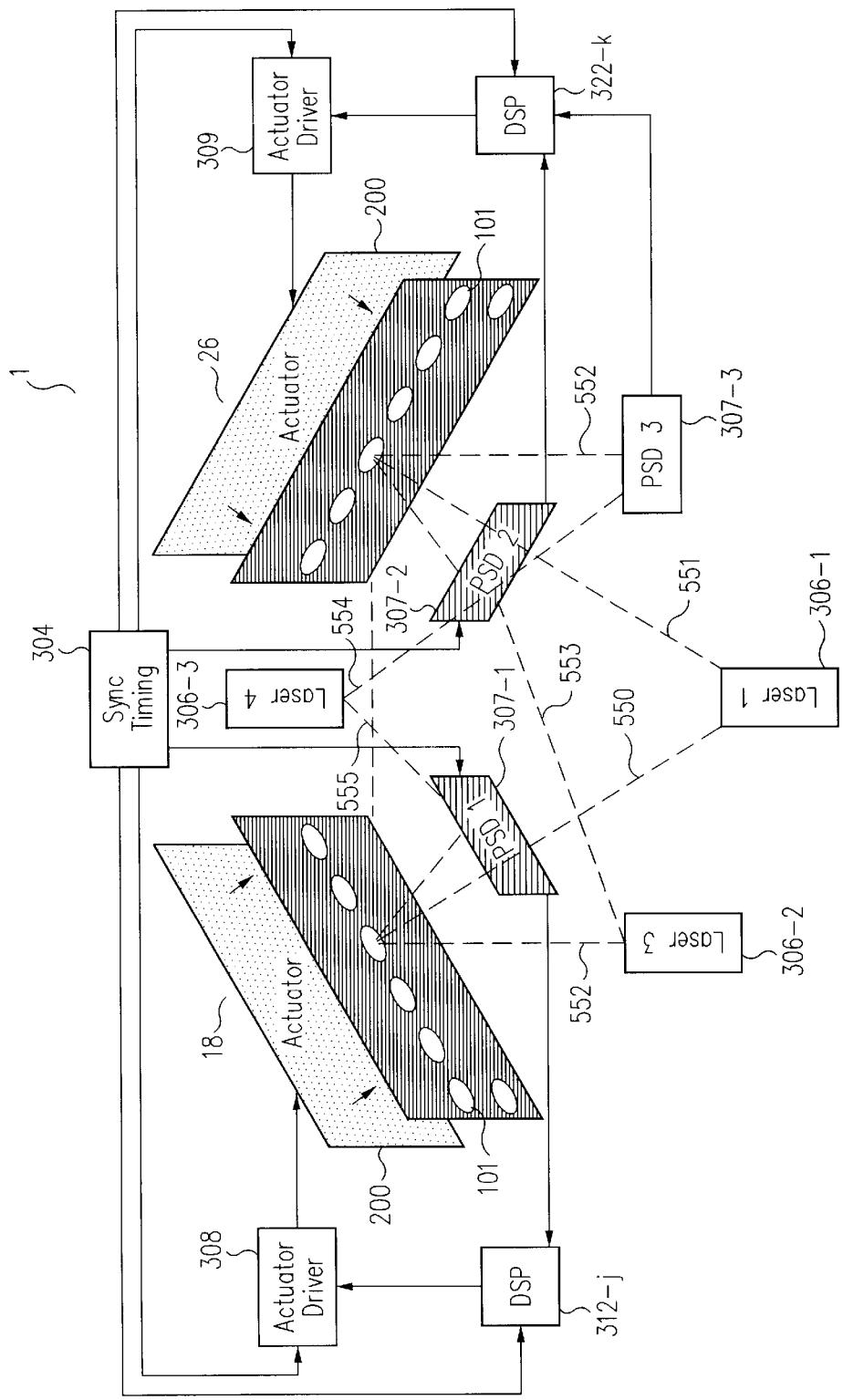
FIG. 5A shows a block diagram of an embodiment of a switching fabric with lasers producing control beams and calibration beams for controlling the orientations of individual mirrors.

FIG. 5A shows a schematic diagram of a control loop according to the present invention. Mirror arrays 18 and 26 are both shown with actuator layer 200 and mirror surfaces 101 (see FIG. 2A). Mirror array 18 shows the jth row of mirrors which, in the embodiment shown in FIG. 5A, is controlled by DSP 312-j of local mirror controller 310. Further, mirror array 26 shows a kth row of mirrors, which is controlled by DSP 322-k of local mirror controller 320. In the particular example shown in FIG. 5A, light is being directed between a mirror in the jth row of mirror array 18 and a mirror in the kth row of mirror array 26.

DSP 312-j of local mirror controller 310 is coupled to communicate with actuator driver 308, which is coupled to actuator surface 200 of mirror array 18 to control individual mirrors of mirror array 18. Similarly, DSP 322-k of local mirror controller 320 is coupled to communicate with actuator driver 309, which is coupled to actuator surface 200 of mirror array 26 to control individual mirrors of mirror array 26. PSD 307-1 is positioned to receive a control beam 550 substantially coincident with input light beams from input port 4 (FIG. 1) reflected from individual mirrors of mirror array 18. PSD 307-2 is positioned to receive a control beam 551 substantially co-linear with output light beams to output port 6 (FIG. 1), traveling opposite to the output signal light beams, and reflected from mirror array 26. PSD 307-3 is positioned to receive a control beam 552 that travels substantially coincident with input light beams from input port 4 and being reflected by individual mirrors from mirror array 18 and by corresponding individual mirrors from mirror array 26. One skilled in the art will recognize that there are various alternative arrangements of PSDs and control beams.

Laser 306-1 provides control beam 550 which is directed coincident with the input light beam from input port 4 and reflected from individual mirrors of mirror array 18 onto corresponding cells of PSD 307-1. Laser 306-1 further provides control beam 551 which is directed coincident with the output light beam to output port 6, and traveling in a direction that is opposite that of the output light beam, and is reflected from individual mirrors of mirror array 26 onto corresponding cells of PSD 307-2. Laser 306-2 provides control beam 552 that is directed coincident with the input beams from input port 4, is reflected from individual mirrors of mirror array 18 and corresponding individual mirrors of mirror array 26 onto corresponding cells of PSD 307-3. Therefore, control beam 552 from laser 306-2 follows the path of individual input beams from input ports 4 to output ports 6. The measured position of control beams 550 and 551 from laser 306-1 on cells of PSD 307-1 and 307-2, respectively, provide coarse alignment data regarding the orientations of individual mirrors on mirror array 18 and mirror array 26. The position of control beam 552 from laser 306-2 on PSD 307-3 provides fine alignment data regarding the relative orientations of individual mirrors of mirror array 18 and corresponding individual mirrors of mirror array 26 and therefore provides data on the overall desired routing from input ports 4 to output ports 6.

In addition to control beam 552, laser 306-2 provides a calibration beam 553 which is directed onto cells of PSD 307-2. Further, laser 306-3 provides calibration beams 554 and 555 which are directed onto cells of PSD 307-3 and PSD 307-1, respectively. Calibration beams 553, 554, and 555 are not reflected from mirror array 18 or mirror array 26. Therefore, the position of calibration beams 553, 554, and 555 on PSDs 307-2, 307-3, and 307-1, respectively, provide information regarding any drift in PSD detectors 307-1 through 307-3 so that measured values of the position of a control beam can be corrected. The optical paths shown in FIG. 5A are further described in U.S. application Ser. No. 09/999,878 and U.S. application Ser. No. 09/839,848. Another embodiment with a different arrangement of lasers and PSDs which is also applicable to embodiments of the present invention is described in U.S. application Ser. No. 10/002,310.

Coarse data related to the orientation of the physical orientations of individual mirrors of mirror array 18 and 26 is derived from measured intensity data on individual corresponding cells of PSD 307-1 and PSD 307-2, when control beams 550 and 551 are on. In some embodiments, each of the individual mirrors on mirror array 18 is monitored by a corresponding cell of PSD 307-1 and each of the individual mirrors on mirror array 26 is monitored by a corresponding cell of PSD 307-2. Fine data related to the relative orientations of individual mirrors on mirror array 18 and individual mirrors on mirror array 26 is monitored by cells on PSD 307-3 which correspond to individual mirrors of mirror array 26, when control beam 552 is on. In some embodiments, laser 306-2 and PSD 307-3 may be arranged so that PSD 307-3 monitors individual mirrors of mirror array 18 instead. Since each of the individual mirrors of mirror arrays 18 and 26 drift from the assigned orientations (i.e., the orientations that cause light to be directed between input ports 4 and output ports 6 as assigned by network controller 301) between adjustments due to vibrations and other factors, individual mirrors may need to be frequently adjusted to hold position. In some embodiments, adjustments of each individual mirror can be accomplished on the order of 10,000 times per second or faster. Additionally, through calibration beams 553, 554, and 555, the operation of PSD 307-1 through 307-3 is checked periodically in order to correct the response of DSPs 312-j and 322-k to any variations in operation.

Figure 5B:
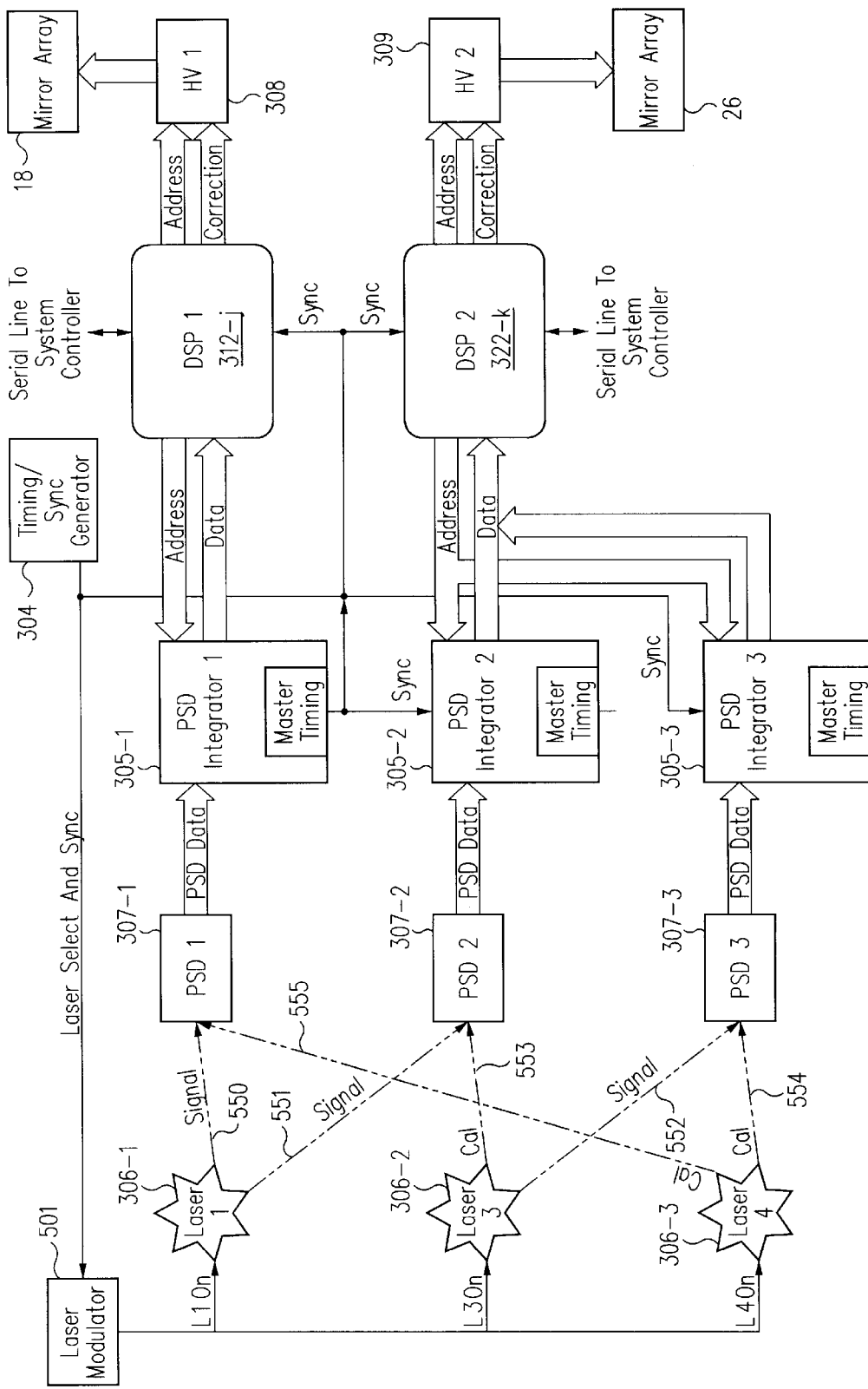
FIG. 5B shows a block diagram of a feed-back based control system for controlling the orientation of individual mirrors of the switching fabric according to the present invention.

FIG. 5B shows a block diagram of an embodiment of a control system 400 of control system 20 corresponding to switching fabric 1 shown in FIG. 5A. A laser modulator 501 provides laser signals to lasers 306-1 through 306-3. As discussed above, laser 306-1 provides control signals 550 and 551 to PSDs 307-1 and 307-2 (through mirror arrays 18 and 26, respectively), laser 306-2 provides control signal 552 to PSD 307-3 (through both mirror array 18 and mirror array 26) and calibration signal 553 to PSD 307-2, and laser 306-3 provides calibration signals 555 and 554 to PSD 307-1 and 307-3, respectively. The output signals from PSD 307-1 is input to integrator 305-1, the output signals from PSD 307-2 are input to integrator 305-2, and the output signals from PSD 307-3 are input to integrator 305-3. The digitized output signals from integrator 305-1 are read by DSP 312. DSP 322, in the particular embodiment described here, reads the digitized output signals from PSD 305-2 and PSD 305-3. Based on the digitized data read from integrator 305-1, DSP 312 provides output signals to actuator driver 308 to control the orientation of individual mirrors of mirror array 18. Based on the digitized data read from integrator 305-2 and integrator 305-3, DSP 322 provides output signals to actuator driver 309 to control individual mirrors of mirror array 26.

Timing/Sync generator 304 provides timing for the servo loop defined by lasers 306-1, 306-2 and 306-3, PSDs 307-1 through 307-3, DSPs 312 (collectively DSPs 312-1 312-M) and 322 (collectively 322-1 through 322-M), actuator drivers 308 and 309 and mirror arrays 18 and 26. In some embodiments, only one of lasers 306-1 through 306-2 is active at any given time, during which data from PSDs 307-1 through 307-2 is being integrated by integrators 305-1 through 305-3. Furthermore, data that has already been acquired by integrators 305-1 through 305-3 can be read and acted upon by DSPs 312 and 322. Data acquired when laser 306-1 is active, for example, is utilized to adjust the orientation of individual mirrors in mirror array 18 and mirror array 26. Data acquired when laser 306-2 is active is utilized to calibrate the data read from PSD 307-2 and finely adjust the orientation of individual mirrors in mirror array 26. Data acquired when laser 306-3 is active is utilized to calibrate data taken from PSD 307-1 and 307-3. One skilled in the art will recognize that variations in relative positions of lasers 306 and PSDs 307 may result in other calibration and adjustment timings and procedures. In some embodiments, DSP 312-j and DSP 322-k can be a TMS320C6711 Digital Signal Processors. Some embodiments of drivers 308 and 309 are described in U.S. application Ser. No. 10/082,822, "MEMS Driver," by Hakan Ates Gurcan, assigned to Decicon, Inc., herein incorporated by reference in its entirety.

Figure 5C:
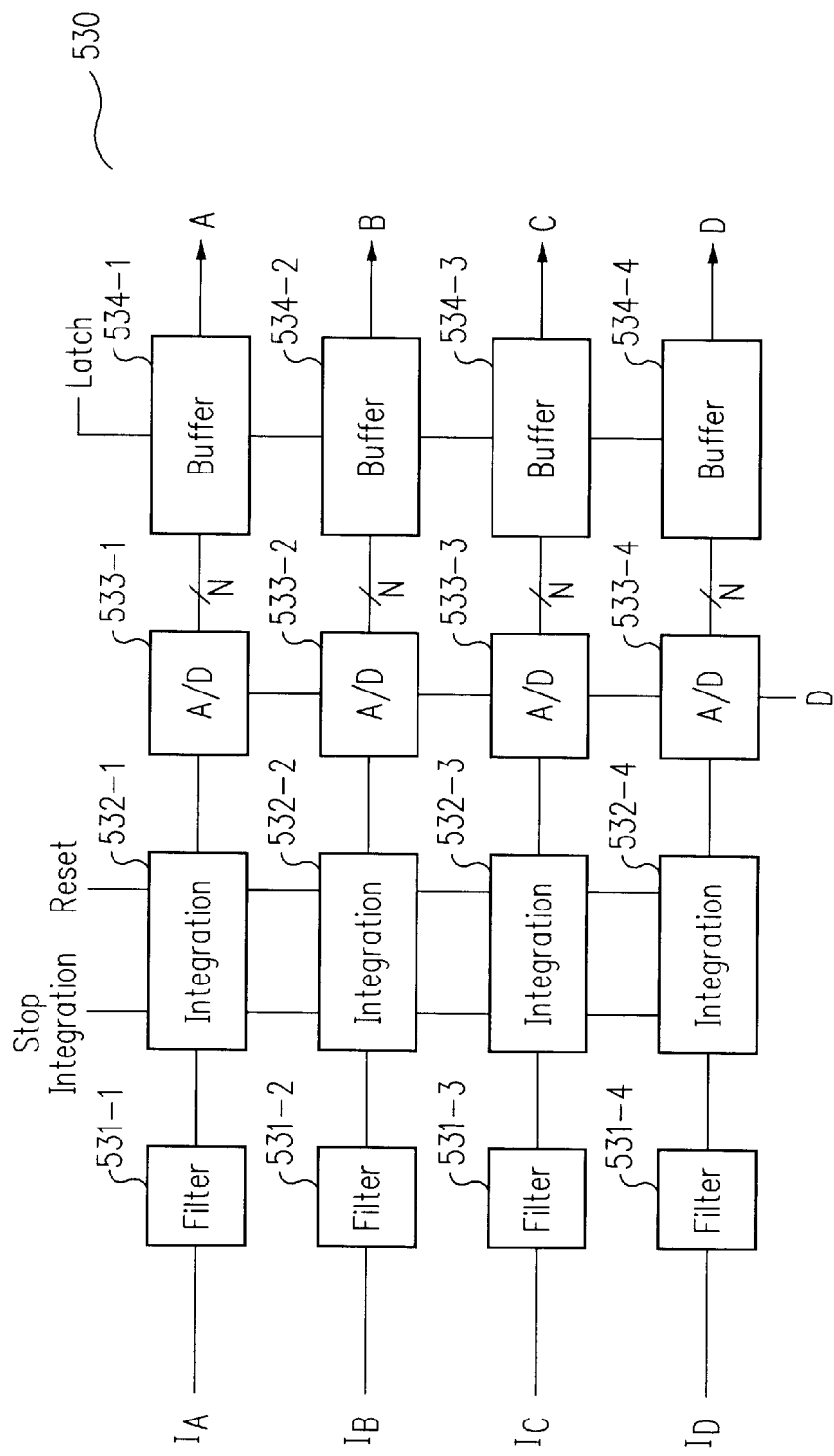
FIG. 5C shows a block diagram of an integration and digitization circuit for receiving signals from a cell of a position sensitive detector according to the present invention.

FIG. 5C shows an example of a PSD integrator circuit 530, which process the data from a single cell of one of PSDs 307-1 through 307-2. Integrator 305-1, for example, may include a number of circuits 530 which correspond to the number of cells of PSD 307-1. As shown in cell 401-j,k of FIG. 4, a cell includes four regions 402-j,k, 403-j,k, 404-j,k and 405-j,k. Therefore, four intensity signals $I_A$, $I_B$, $I_C$, and $I_D$, referred to as the PSD signals, are received into circuit 530.

PSD signals $I_A$, $I_B$, $I_C$, and $I_D$ can be received into filters 531-1 through 531-4, respectively. The output signals from filters 531-1 through 531-4 are received in integration circuits 532-1 through 532-4, respectively. Integration circuits 532-1 through 532-4 are controllable so that at a particular time they are reset and then at a set time after that integration is stopped. Therefore, integration circuits 532-1 through 532-4 integrate from zero for a preset period of time. Once integration circuits 532-1 through 532-4 have finished integrating the output signals from filters 531-1 through 531-4, respectively, then the output signals from integration circuits 532-1 through 532-4 are input to analog-to-digital converters (ADCs) 533-1 through 533-4. In some embodiments, a sample and hold circuit stores the output of integration circuits 532-1 through 532-4 and the analog integration signals are digitized after being read by a multiplexer circuit. In the embodiment shown in FIG. 5C, the digitized output signal from A/D converters 533-1 through 533-4 are input to storage registers 534-1 through 534-4. The timing is set so that the digitization by ADCs 533-1 through 533-4 is accomplished after integration circuits 532-1 through 532-4 is finished integrating and before integration circuits 532-1 through 532-4 are reset. Further, storage registers 534-1 through 534-4 latch the output signals from ADCs 533-1 through 533-4 after ADCs 533-1 through 533-4 are finished digitizing. The output signals from registers 534-1 through 534-4, signals A, B, C, and D, respectively, can be read by one of DSP 312 or DSP 322.

Figure 5D:
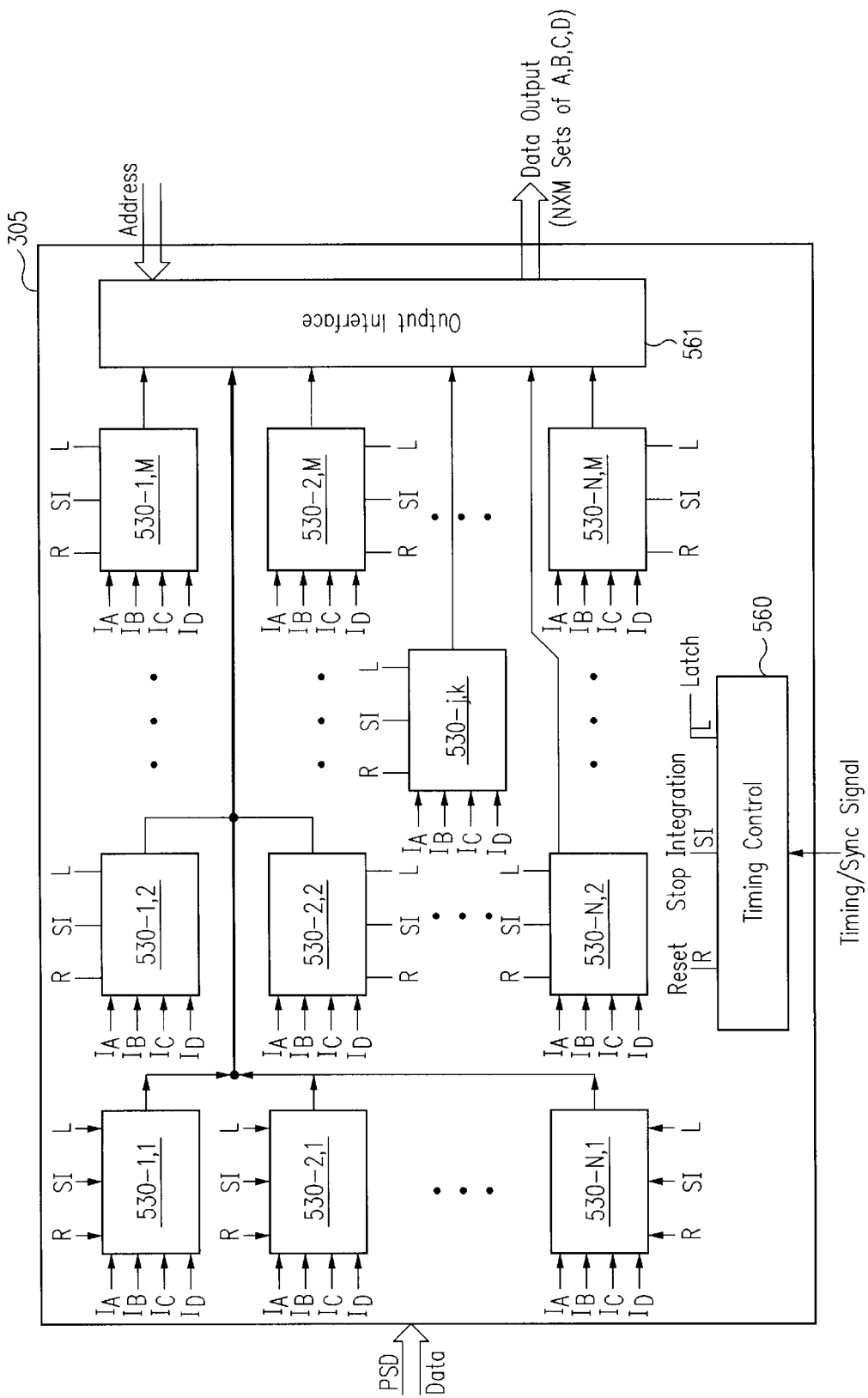
FIG. 5D shows a block diagram of an embodiment of an integration and digitization circuit for receiving signals from a position sensitive detector according to the present invention.

FIG. 5D shows an embodiment of an integration and digitization circuit 305 which process data from one PSD such as PSD 400 of FIG. 4. Integration and digitization circuit 305 of FIG. 3, for example, processes PSD data from each of PSDs 307-1 through 307-Q. Integrators 305-1 through 305-3 of FIG. 5B process data from PSDs 307-1 through 307-3, respectively.

Integration and digitization circuit 305, if utilized with PSD 400 of FIG. 4, receives PSD data from each of cells 403-1,1 through 403-N,M. Since each of cells 403-1,1 through 403-N,M is a quadrature detector, each cell provides four PSD signals labeled $I_A$, $I_B$, $I_C$, and $I_D$ in FIG. 305. Integration circuit 530-j,k in FIG. 5D, for example, receives signals $I_A$, $I_B$, $I_C$, and $I_D$ from cell 401-j,k. Each of integration circuits 530-j,k can be integration circuit 530 as shown in FIG. 5C.

Furthermore, a timing and synchronization signal is input to timing circuit 560. Timing circuit 560, in response to the timing signals, provides signals reset (R), stop integration (SI), digitize (D), and latch (L) to each of integration circuits 530-1,1 through 530-N,M so as to provide the appropriate timing. Output interface 561 interacts with DSP 312 or DSP 322 (see FIG. 5B). Output interface 561 receives one or more addresses from which data is to be read and directs the appropriate digitized output from the selected ones of integration circuits 530-1,1 through 530-N,M to the data output bus. In some embodiments, the address presented on the address bus can be a column address, for example for column k, in which case output data from integration circuits 530-1,k through 530-N,k can be simultaneously read out of integration circuit 305. One skilled in the art will recognize other addressing and read-out schemes for reading data from integration and digitization circuit 305.

Figure 5E:
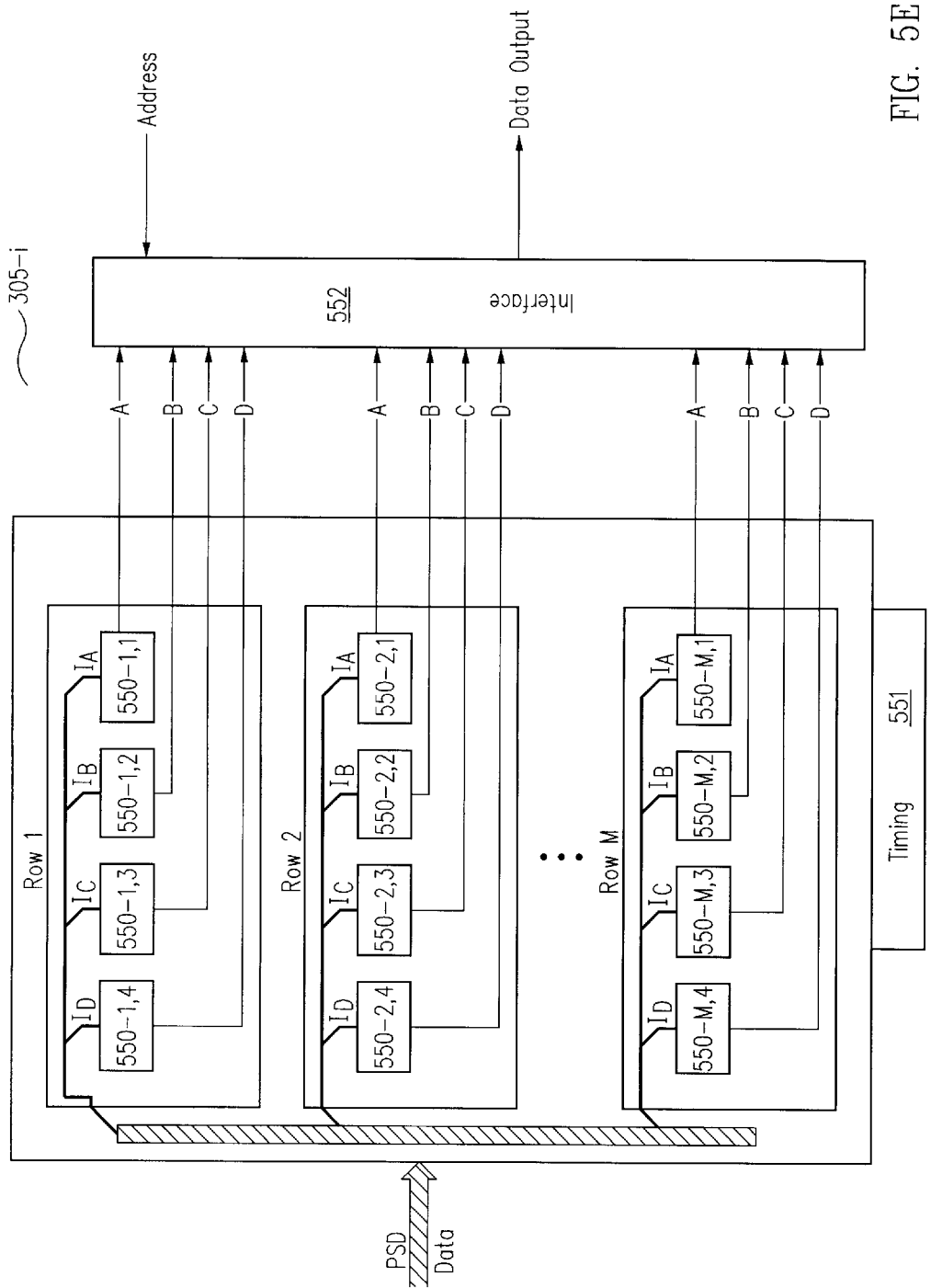
FIG. 5E shows a block diagram of another embodiment of an integration and digitization circuit for receiving signals from a position sensitive detector according to the present invention.

FIG. 5E shows another embodiment of integration and digitization circuit 305-i, which is one of the integration circuits shown in, for example, FIG. 5B. Integration and digitization circuit 305-i includes integration circuits 550-1,1 through 550-M, 4 in a quad PSD system. PSD data is received from each PSD cell 401-1,1 through 401-N,M. In the embodiment shown in FIG. 5E, data is segregated by rows so that integration circuit 550-1, 1 through 550-1,4 receives current data $I_A$, $I_B$, $I_C$, and $I_D$ from each of PSD cells 401-1,1 through 401-1, M of the first row of PSD cell 400 (FIG. 4).

Figure 5F:
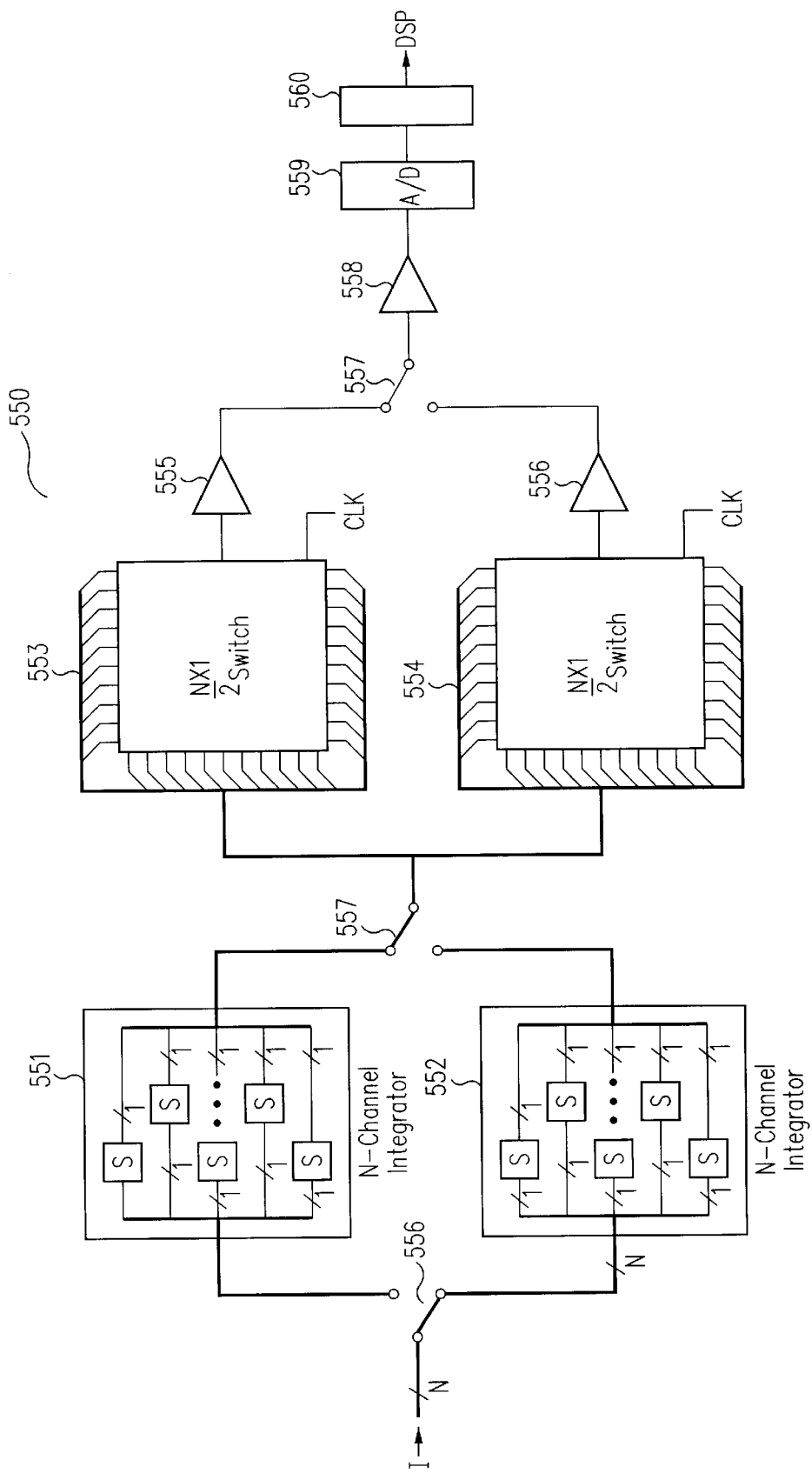
FIG. 5F shows a sub component of the integration and digitization circuit shown in FIG. 5E.

FIG. 5F shows one of integration circuits 550-1,1 through 550-M, 4, integration block 550. A current signal from each of the N PSD cells 401-1,j through 401-N,j is input to one of N-Channel integrator 551 or N-Channel integrator 552, depending on the setting of switch 556. Switch 557 selects one of N-channel integrator 551 or N-channel integrator 552 for output. Switches 556 and 557 can be set such that while one of N-channel integrators 551 and 552 are charging, the other one of N-channel integrators 551 and 552 is being read out. In some embodiments, integrated data from even numbered elements of PSD cells 401-1,j through 401-N,j (i.e., 401-2,j, 401-4, j . . . 401-N,j) can be input to switch 553 while odd numbered PSD cells (i.c., 401-1,j, 401-3,j . . . 401-(N-1),j) can be input to switch 554. The output signal from switch 553 is input to amplifier 555 and the output signal from switch 554 is input to amplifier 556. Switch 557 alternately chooses output signal from amplifiers 555 and 556. Switches 553 and 554 can be orthogonally clocked so that while the output signal from amplifier 555, for example, is being input to amplifier 558, the output signal from amplifier 556 is settling. The output signal from amplifier 558 is digitized in analog-to-digital converter 559 and output to a line driver 560.

As shown in FIG. 5E, the output signals from each of integration circuits 550-1,1 through 550-M, 4 are input to interface 552. Interface 552 receives address requests from one of DSPs 312-j and 322-k (FIG. 5B) and outputs the requested data for that row. In some embodiments, the address can be a row address, in which case interface 552 outputs data, for example serially, for the entire row. In some embodiments, individual PSD cells 401-1,1 through 401-N,M can be selected and the four integrated and digitized data values for that cell can be output.

Figure 5G:
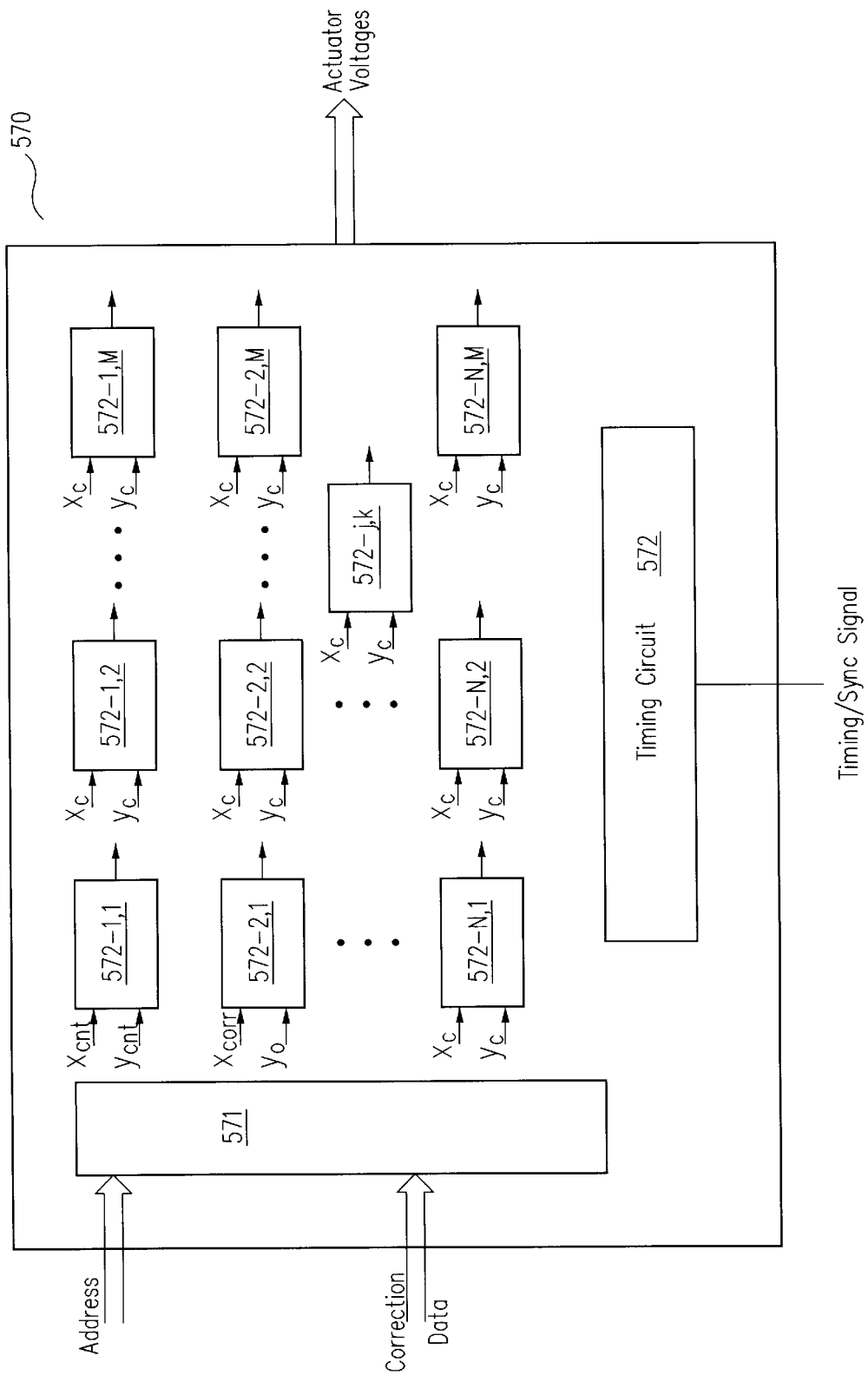
FIG. 5G shows a block diagram of an actuator driver circuit for controlling the voltages applied to actuators of individual mirrors of the mirror arrays in response to control signals.

FIG. 5G shows an embodiment of actuator driver 570 which can be either of actuator drivers 308 and 309. Actuator driver 570 includes an interface 571 which receives correction data from DSPs 312 and 322 and addresses. Again, interface 571 may contain corrections and addresses for multiple individual mirrors of a mirror array (which is mirror array 18 for actuator driver 308 and mirror array 26 for actuator driver 309). Individual corrections are received into driver circuits 572-1,1 through 572-N,M. For example, driver circuit 572-j,k receives, when addressed, correction data $x_c$ and $y_c$ for the individual mirror at row j and column k of the mirror array coupled to actuator driver 570. Actuator driver 572-j,k then provides new actuator voltages for the individual mirror at row j and column k and holds that actuator voltage until new correction data is received.

Figure 6:
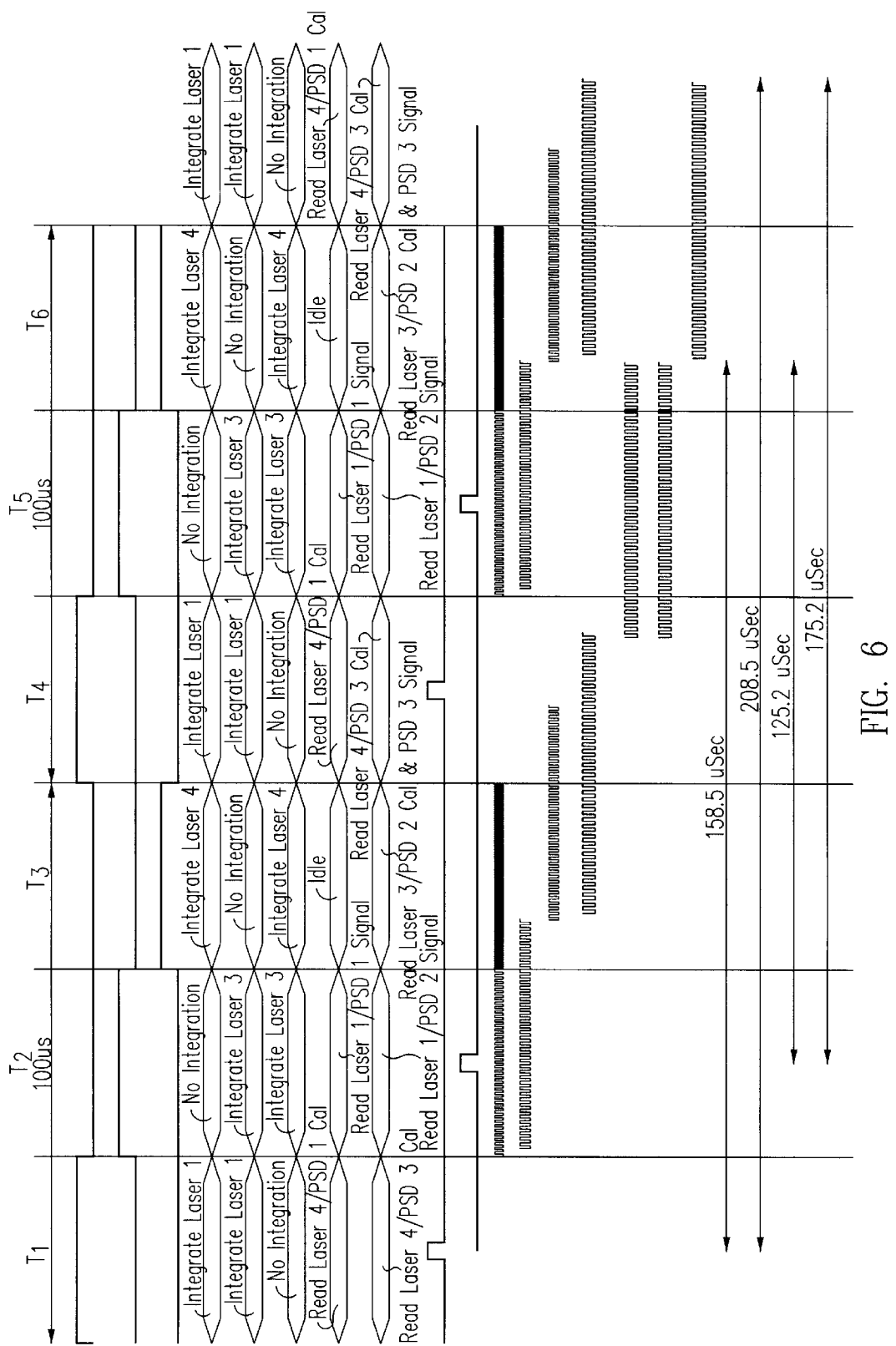
FIG. 6 shows a timing diagram of a feed-back based control system according to the present invention.

FIG. 6 shows a timing diagram for the time-based multiplexing of the control servo system shown in FIG. 5B. FIG.

6 shows an embodiment of a timing sequence for an embodiment of the servo system shown in FIG. 5B. In particular, FIG. 6 shows the operation of the servo system shown in FIG. 5B for six contiguous time periods $T_1$ through $T_6$. In some embodiments, the six contiguous time periods $T_1$ through $T_6$ have equal time duration. In some embodiments, the time periods $T_1$ through $T_3$ are, for example, about 100 μs in duration, so that each individual time period is about 33.33 μs in duration. However, embodiments of the invention can include time periods of any duration.

In time period $T_1$, laser 306-1 is turned on while lasers 306-2 and 306-3 are turned off. Shortly after laser 306-1 is turned on, integrator circuits 305-1 and 305-2 are set to integrate. No light beam is incident on integrator circuit 305-3 so it does not matter whether integrator circuit 305-3 is integrating or not. Shortly before the end of time period $T_1$, integration circuits 305-1 and 305-2 stop integrating and the data from the integration is held. Further, during time period $T_1$ DSP 312 reads the data from integration circuit 305-1 which was accumulated in the time period immediately preceding time period $T_1$ and DSP 322 reads the data from integration circuit 305-3 which was accumulated in the time period immediately preceding time period $T_1$. In the time period immediately preceding time period $T_1$, laser 306-3 had been activated and integration circuits 305-1 and 305-3 had integrated and accumulated PSD data from calibration beams 555 and 554, respectively.

In time period $T_2$, laser 306-1 and 306-3 are turned off and laser 306-2 is turned on. Shortly after laser 306-2 is turned on, integration circuits 305-2 and 305-3 start integration of PSD signals from PSDs 307-2 and 307-3, respectively. Shortly before laser 306-2 is turned off at the end of time period $T_2$, integration circuits 305-2 and 305-3 stop integrating and store the integration results for later output. Additionally, during time period $T_2$ DSP 312 reads the data accumulated by integration circuit 305-1 during time period $T_1$ and DSP 322 reads the data accumulated by integration circuit 305-2 during time period $T_1$. In some embodiments, a burst column read is performed. Therefore, for example, in a 40 column system where each of DSP 312-j reads from one row, DSP 312-j receives in sequences the 40 PSD data values (which includes the A, B, C, and D values integrated from the PSD data).

Further, during time period $T_2$, DSP 312 begins calculations on the data being read from integration circuit 305-1 to provide coarse corrections of individual mirror orientations of mirror array 18. Furthermore, DSP 322 begins calculations on the data being read from integration circuit 305-2 to provide coarse corrections of individual mirror orientations of mirror array 26. A further discussion of these calculations is presented below.

During time period $T_3$, lasers 306-1 and 306-2 are shut off and laser 306-3 is turned on. Shortly after laser 306-3 is turned on, integration circuits 305-1 and 305-3 start integration of PSD data received from PSDs 307-1 and 307-3, respectively. Further, DSP 322 reads the data accumulated by both integration circuits 305-2 and 305-3 during the $T_2$ time period. Additionally, as soon as DSP 322 finishes calculating the coarse orientation corrections for mirror array 26, DSP 322 begins calculation of the fine coarse correction utilizing data currently being read in from integration circuit 305-3. Shortly after DSP 322 begins calculation of the fine coarse corrections, the x-axis corrections to mirror array 18 are serially (usually by column) output to actuator driver 308 by DSP 312 and the x-axis corrections to mirror array 26 are serially (usually by column) output to actuator driver 309 by DSP 322. The output of the x-axis corrections to actuator drivers 308 and 309 can extend into time period $T_4$.

During time period $T_4$, laser 306-1 is again turned on as it was in time period $T_1$ and lasers 306-2 and 306-3 are turned off. Integration circuits 305-1 and 305-2 then accumulate PSD data from PSDs 307-1 and 307-2. Further, accumulated calibration data from integration circuit 305-1 is read by DSP 312 and accumulated calibration data from integrated circuit 305-3 is read by DSP 322. As soon as the x-axis correction data is read out to actuator drivers 308 and 309, the y-axis correction data is read out to actuator drivers 308 and 309. At the same time as the y-axis correction data is read out, x-axis voltage stabilization begins. As soon as the y-axis data is read out to actuator drivers 308 and 309, then y-axis stabilization begins in time period $T_6$.

The functions performed in time periods $T_4$, $T_5$, and $T_6$ are identical to the functions performed in time periods $T_1$, $T_2$, and $T_3$, respectively. Therefore, there is roughly a 4.5 time period lag between the time that coarse PSD data (with laser 306-1 activated) is initiated and the time that x correction data reaches mirror arrays 18 and 26. Further, there is approximately 6 time period lag before y-correction data reaches mirror arrays 18 and 26. Therefore, there is significant delay in the response of mirror arrays to data measured in the coarse correction step. In other words, the corrections resulting from data taken in time period $T_1$ have not been completed before the data taken in step $T_4$ is accumulated.

Figure 7A:
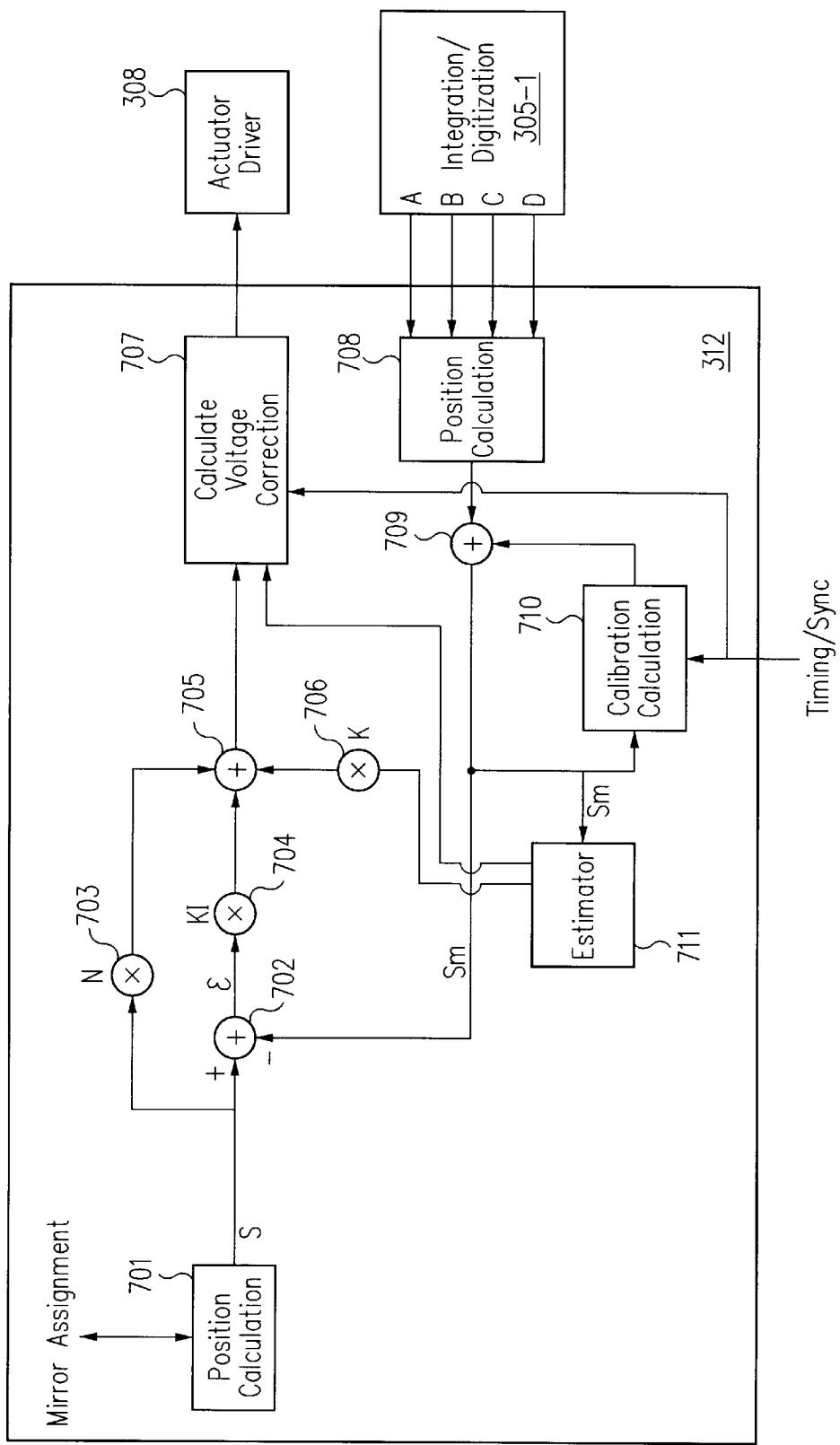
FIG. 7A shows a block diagram of a mirror-controller algorithm describing a feed-back control system according to the present invention.

FIG. 7A shows a block diagram of a servo algorithm executing on DSP 312 according to the timing diagram illustrated in FIG. 6. FIG. 7A shows the correction of one of the two directions of the orientations of one individual mirror of mirror array 18. The calculation illustrated here, as shown in FIG. 6, is carried out in DSP 312 for both directions of each of the individual mirrors of mirror array 18. Each individual mirror of mirror array 18 corresponds to a particular one of input ports 4 (FIG. 1). The orientation of an individual mirror of mirror array 18 can be characterized in terms of the location on the corresponding cell of PSD 307-1 to which a control beam is directed. The location on PSD 307-1, then, is correlated with which individual mirror of mirror array 26 that receives light from the individual mirror of mirror array 18. Each individual mirror of mirror array 26 corresponds with a particular output port. Therefore, the output port assignment for each individual mirror of mirror array 18 corresponds to particular (x,y) coordinates on the corresponding cells of PSD 307-1 to which control beams are directed. Position calculation 701, then, translates the port assignment for the individual mirror of mirror array 18 to a linear coordinate for the corresponding cell of PSD 307-1.

Mirror assignments for mirror array 18 (i.e. to which output port each of the individual mirrors of mirror array 18 is to be directed) is input to position calculation 701 of DSP 312. An output port assignment can be received from supervisory controller 302 (FIG. 3) for each individual mirror of mirror array 18. In some embodiments, position calculation 701 includes looking up the position s (which can be either x or y depending on which direction is being adjusted) for each individual mirror which corresponds to that mirror's respective output port assignment in a look-up table. The desired coordinate s is then held as the output signal of position calculation 701.

Position calculation 708 receives the quadrature signal from the corresponding cell of PSD 307-1 which has been integrated and digitized by integration circuit 305-1. Position calculation 708 then calculates the measured s position $s_m$ on the cell of PSD 307-1 for a control beam from the individual mirror of mirror array 18. The s position $s_m$ is calculated as in Equation 10 for the x-coordinate or Equation 11 for the y-coordinate.

The output value from position calculation 708, $s_m$, is input to summer 709 where a correction term is added from calibration calculation 710. During time periods $T_1$ and $T_4$ of the timing diagram of FIG. 6, for example, the values input to position calculation 708 are a result of calibration beams from laser 306-3 (acquired during the time period preceding period $T_1$ and time period $T_3$), which is not directed through individual mirrors of mirror array 18. These values provide calibration data to adjust for drift over time of the cells of PSD 305-1. Therefore, for example, the position of calibration beams on cells of PSD 305-1 should be (0,0) (or some defined value) and therefore any measurable difference from 0 in the measured position $s_m$ is subtracted from subsequent measurements.

During time periods $T_2$ and $T_5$ in FIG. 6, the values input to position calculation 708 are the result of calibration beams from laser 306-1 accumulated in time periods $T_1$ and $T_4$, respectively. The measured value $s_m$ from data received during time periods $T_2$ and $T_5$, then, correspond to the orientation of individual mirrors of mirror array 18. The measured value is corrected in summer 709 by subtracting the value arrived at by calibration calculation 710. The value $s_m$ is then subtracted from the value s output from position calculation 701 in summer 702 to obtain an error signal $\epsilon$. The error signal $\epsilon$ is then multiplied by a gain factor KI in multiplier 704 and input to summer 705. Summer 705 also receives the calculated position s from position calculation 701 multiplied by a constant N. Both KI and N are scalar constants associated with the strength of corrective response given by the error calculation accomplished in summer 702 and the influence of the calculated position s from position calculation 701. The value N times the position is the expected torque required on mirror 100 in order to achieve the calculated position s. The value KI times the error E is the correction required to achieve that result.

Estimator 711 calculates a state of the mirror based on the position $s_m$. The state of the mirror can be described by several quantities that collectively describe the mirror's dynamic state. These quantities can include the angular orientation and the change in the angular orientation. These state can be estimated in estimator 711 using the mode of the dynamic response of mirror 100 described in Equations 1 through 7. The state is multiplied by a matrix K to produce a scalar quantity in multiplier 706 and added in summer 705. The quantity K times the state represents the correction to the torque applied to mirror 100 in order to correct for the estimated dynamic state of the mirror.

The values found in the matrix K and the scalar KI can be determined using either direct pole placement or methods associated with Linear Quadratic Regulator (LQR) design. The values are chosen based on a modeling of the response characteristics of mirror 100 (FIG. 2A). A typical value for N is about $-2\pi(500)$.

The output signal from summer 705 is a torque that should be applied to the actuator of mirror, then, is a torque value that will be applied to mirror 100. Voltage correction 707 translates the torque quantity into a voltage command for actuator driver 308. Voltage correction 707 linearizes the relationship between the controller's output and the mirror angle by mapping the torque required to the voltage required to achieve that torque. An example relationship between the torque and voltage is shown in FIG. 2E.

Voltage correction 707 receives the torque output from summer 705 and an estimate of the actuator angle of mirror 100 from estimator 711. Estimator 711 calculates the angle of mirror 100 from the measured position $s_m$. Correction 707 then calculates the voltage required to achieve the torque requested. The relationship between torque and voltage, such as that shown in FIG. 2E, is also dependent on the current angular position of mirror 100.

From the timing diagram shown in FIG. 6, during time periods $T_1$ and $T_4$, data received at position calculation 708 is utilized by calibration calculation 710 for calibration. During time periods $T_2$ and $T_5$, data received at position calculation 708 is utilized to provide input to voltage correction algorithm 707. Voltage correction algorithm 707 holds the output data until time periods $T_3$ and $T_6$ in order to synchronize with the calculations of DSP 322.

Figure 7B:
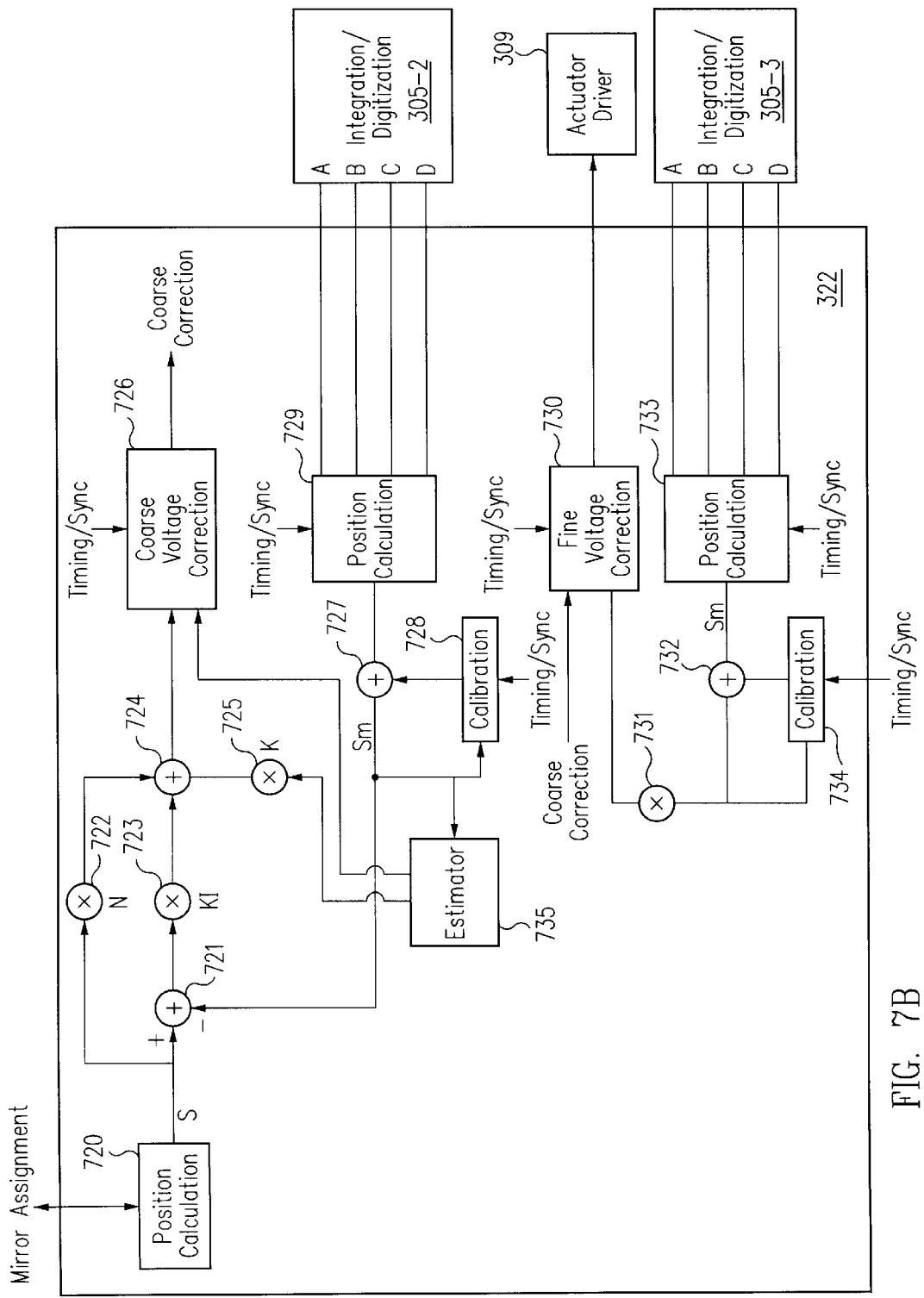
FIG. 7B shows a block diagram of a mirror-control algorithm describing a feed-back control system according to the present invention.

FIG. 7B shows a block diagram of the calculation performed by DSP 322. As shown in the embodiment shown in FIG. 5B, DSP 322 receives PSD data from integration circuit 305-2 and 305-3. In principle, each of DSP 312 and DSP 322 may receive data from any number of individually placed PSDs 307-1 through 307-Q. The embodiment of DSP 322 of FIG. 7B corresponds to the embodiment of servo system shown in FIG. 5B and with the timing sequence shown in FIG. 6.

From FIG. 6, during time period $T_1$ and $T_4$, DSP 322 reads calibration data from integration and digitization circuit 305-3. The calibration data was accumulated by turning laser 306-3 on in the time period preceding time period $T_1$ and in time period $T_3$. Data is received in position calculation 733, which calculates the position of the calibration beams on cells of PSD 307-3. The positions are summed with the results of a previous calibration in summer 732 and calibration 734 adjusts the calibration value to compensate for any offset in the position of the calibration beam. In some embodiments, the calibration beam should be at a 0 position and the new calibration value can be the measured position of the calibration beam. Position calculation 733 can calculate positions according to equations 10 and 11 above.

In time periods $T_2$ and $T_5$, DSP 322 reads control data from integration and digitization 305-2. The control data was accumulated during time periods T, and $T_4$, respectively, when laser 306-1 was turned on. The control data is input to position calculation 729 which calculates the position of control beams on the cells of PSD 307-2 in accordance with equations 10 and 11 above. The position measurement $s_m$ is summed with a calibration offset calculated in calibration 728 in summer 727. The output value from summer 727 is subtracted from a target position s in summer 721. The target position s is calculated in position calculation 720.

Position calculation 720 receives port routing instructions (i.e., instructing each of the individual mirrors of mirror array 26 to couple light from an assigned one of input ports 4) from supervisor controller 302 (FIG. 3) and calculates the orientation position s required to achieve that routing. In some embodiments, position calculation 720 uses a look-up table which can be maintained through supervisor controller 302 in order to determine the orientation position s.

The difference between the orientation position s and the measured position $s_m$ is multiplied by a factor KI in multiplier 723 and added to a multiple of the orientation position s calculated by multiplier 722 and a multiple of the mirror state times a multiplier matrix K calculated in multiplier 725. The output value from summer 724 is input to coarse voltage correction 726, which calculates a coarse voltage correction. This calculation is executed the same as that described with respect to summer 705, estimator 711, and voltage correction 707 in FIG. 7A.

In time periods $T_3$ and $T_5$, DSP 322 reads calibration data from integration circuit 305-2 and control data from integration circuit 305-3. The calibration data from integration circuit 305-2 is input to position calculation 729 which calculates a calibration position. The calibration position is summed with the previous calibration in summer 727. Calibration 728 then adjusts the calibration value output from calibration 728 in response to the calibration signal, in some embodiments, such that the calibration value zeros the measured position during calibration.

The control data from integration circuit 305-3 is input to position calculation 733. Position calculation 733 then calculates the position of control beams on cells of PSD 307-3 in accordance with equations 10 and 11 above. The output values from position calculation 733 are then summed with a calibration value in summer 732. A multiple, calculated in multiplier 731, of the output value from summer 732 is input to fine voltage correction 730. Fine voltage correction 730 also receives the coarse voltage correction and, in response to the coarse voltage correction and the fine voltage correction, outputs voltage correction values to actuator driver 309. As shown in FIG. 6, x and y coordinate values are output sequentially to actuator driver 309.

The above described embodiments of the invention are exemplary only and are not intended to be limiting. One skilled in the art will recognize several variations which are intended to be within the scope and spirit of this disclosure. As such, the invention is limited only by the following claims.

We claim:

1. A method of controlling an optical switching fabric, comprising:

receiving port assignment for a first mirror on a first mirror array;

calculating a target position of a first control beam reflected from the first mirror on a corresponding cell of a first position sensitive detector;

measuring an actual position of the first control beam on the cell;

adjusting the orientation of the first mirror so that the measured position matches the target position; and maintaining the orientation of the first mirror so that the measured position matches the target position.

2. The method of claim 1, wherein calculating the target position includes determining the target position from a look-up table based on the port assignment.

3. The method of claim 1, wherein maintaining the orientation of the first mirror includes measuring the position of the first control beam in a first time interval;

measuring the position of a first calibration beam in a second time interval;

correcting the position of the first control beam in response to the position of the first calibration beam in order to obtain a measured position;

comparing the measured position with the target position;

calculating a voltage correction from the comparison of the measured position with the target position;

applying the voltage correction to actuators of the first mirror in order to alter the orientation of the first mirror.

4. The method of claim 3, further including calculating an estimated state of the first mirror.

5. The method of claim 4, wherein the state includes an estimate of an angular position of the first mirror.

6. The method of claim 5, wherein calculating the voltage correction includes calculating a desired torque to apply to the first mirror to achieve the desired position; and converting the desired torque to the voltage correction.

7. The method of claim 6, wherein calculating the desired torque includes adding the desired position times a first factor, the error signal times a second factor, and an estimated state of the mirror times a matrix multiplier.

8. The method of claim 6, wherein converting the desired torque to the voltage correction includes calculating the voltage based on an estimate of the angular orientation of the first mirror and a model of the response of the first mirror.

* * * * *

UNITED STATES PATENT AND TRADEMARK OFFICE
CERTIFICATE OF CORRECTION

PATENT NO. : 6,614,954 B2
DATED : September 2, 2003
INVENTOR(S) : Huang et al.

It is certified that error appears in the above-identified patent and that said Letters Patent is hereby corrected as shown below:

<u>Column 6,</u>
Line 6, delete "ψ" and insert -- φ --.
Line 41, delete "ϕ" and insert -- φ --.

<u>Column 12,</u>
Line 44, delete "405-N" and insert -- 405-N,M --.
Line 52, between "1" and "405-N,M", insert -- through --.

<u>Column 14,</u>
Line 47, between "312-1" and "312-M", insert -- through --.

Signed and Sealed this

Sixteenth Day of March, 2004

JON W. DUDAS
*Acting Director of the United States Patent and Trademark Office*